(12) United States Patent
Tanemura

(10) Patent No.: US 6,551,438 B1
(45) Date of Patent: Apr. 22, 2003

(54) METHOD OF MANUFACTURING MAGNETIC HEAD SLIDER, METHOD OF FIXING ROW BARS, AND CURING AGENT

(75) Inventor: Shigeki Tanemura, Tokyo (JP)

(73) Assignee: TDK Corporation, Tokyo (JP)

( * ) Notice: Subject to any disclaimer, the term of this patent is extended or adjusted under 35 U.S.C. 154(b) by 175 days.

(21) Appl. No.: 09/671,343

(22) Filed: Sep. 27, 2000

(30) Foreign Application Priority Data

Oct. 21, 1999 (JP) ........................................... 11-299414

(51) Int. Cl.[7] .............................................. B32B 31/00
(52) U.S. Cl. ................. 156/265; 29/603.01; 29/603.02; 156/74; 156/155; 156/299; 156/3.6; 156/331.2; 524/90
(58) Field of Search ................................ 156/316, 299, 156/265, 74, 331.2, 155; 29/603.01, 603.2; 524/90

(56) References Cited

U.S. PATENT DOCUMENTS

| 4,359,570 A | * 11/1982 | Davis et al. .................. 524/90 |
| 4,639,477 A | * 1/1987 | Cseh et al. .................... 524/90 |
| 4,791,153 A | * 12/1988 | Yamanaka .................... 524/90 |
| 4,868,972 A | * 9/1989 | Miyakawa et al. ........ 29/603.2 |
| 5,095,613 A | 3/1992 | Hussinger et al. |
| 5,488,857 A | 2/1996 | Homma et al. |
| 5,657,186 A | 8/1997 | Kudo et al. |

FOREIGN PATENT DOCUMENTS

| JP | 10-228617 | 8/1998 |
| JP | 10-302237 | 11/1998 |
| JP | 11-96531 | 4/1999 |
| JP | 11-110727 | 4/1999 |
| JP | 11-282959 | 10/1999 |

* cited by examiner

Primary Examiner—John J. Gallagher
(74) Attorney, Agent, or Firm—Oliff & Berridge, PLC

(57) ABSTRACT

Disclosed are a method of manufacturing a magnetic head slider and a method of fixing row bars, which realize improved fabrication accuracy without increasing manufacturing costs and can prevent adhesion of a foreign matter to a magnetic head slider. After forming a number of thin film magnetic head devices on a wafer by thin film process, the wafer is cut into a plurality of row bars. Before a rail is formed in a predetermined surface of each of the row bars by photolithography, a surface opposite to the surface to be processed of the row bar is bonded and fixed to a support substrate of a wafer shape. A protective film obtained by conducting a heat treatment on a polyimide precursor at temperature lower than temperature at which the polyimide precursor becomes polyimide is formed on the surface of the support substrate. A curing agent film containing a curing agent which promotes setting of the adhesive for bonding the row bars is formed on the surface of the protective film. After applying the adhesive on the surface of the curing agent film, when the surface opposite to the surface to be processed of the row bar is pressed against the adhesive, the adhesive promptly sets by the action of the curing agent. Thus, the row bars can be promptly bonded and fixed to the support substrate. Since the support substrate is covered with the protective film, the support substrate can be prevented from being damaged during the processing of the row bars.

24 Claims, 13 Drawing Sheets

METHOD OF MANUFACTURING MAGNETIC HEAD SLIDER, METHOD OF FIXING ROW BARS, AND CURING AGENT

BACKGROUND OF THE INVENTION

1. Field of the Invention

The present invention relates to a method of manufacturing a magnetic head slider including a thin film magnetic head device for recording or reproducing information on/from a recording medium such as a hard disk, a method of fixing row bars in order to process the magnetic head slider, and a curing agent used to promote setting of an adhesive used for fixing the row bars, or the like.

2. Description of the Related Art

In a magnetic recording apparatus such as a hard disk drive, a thin film magnetic head device for recording or reproducing magnetic information is mounted on a magnetic head slider disposed so as to face a recording surface of a recording medium.

The magnetic head slider is manufactured through the following steps as proposed in Japanese Unexamined Patent Application Publication No. Hei 10-228617, for example.

First, many thin film magnetic head devices are formed by thin film process on a wafer made of a ceramic material, for example. (Subsequently, the wafer is cut into a plurality of row bars, each of which includes at least one magnetic head slider, by using a dicing saw or the like. (The surface of each of the plurality of row bars thus obtained are polished, and then slider rails each having a predetermined shape are formed by etching process using photolithography, or the like. Each row bar in which the slider rails are formed is further cut into separate magnetic head sliders.

The slider rails are formed by processing where the plurality of row bars are bonded and fixed to a predetermined support substrate. It is desirable to reuse the support substrate as often as possible in order to reduce the cost of manufacturing the magnetic head slider. For this purpose, it is necessary to prevent the support substrate from being damaged at the time of the processing (such as etching process) of the slider rails. In some cases, at the time of processing the slider rails, atoms of the surface of the support substrate sputter in association with the etching process or the like and are adhered to a surface to be processed or side faces of a row bar. It is known that such adhesion causes trouble in a hard disk drive. It is therefore desired that such foreign matter is not adhered to the row bars.

Japanese Unexamined Patent Application Publication No. Hei 11-110727 discloses a method of placing row bars with their surfaces opposite to the surfaces to be processed onto a support substrate, forming a polyimide film so as to cover the surface of the support substrate and the whole row bars, and removing only the polyimide film covering the surface to be processed of each of the row bars. According to the method, the surface of the support substrate is covered with the polyimide film, so that the support substrate can be prevented from being damaged at the time of processing the row bars. Since the atoms of the surface of the support substrate do not sputter, the atoms are not adhered to the surface to be processed or side faces of each row bar.

In the method disclosed in Japanese Unexamined Patent Application Publication No. 11-110727, however, since it is technically difficult to completely remove the polyimide film covering the surface to be processed of each row bar, a part of the polyimide film remains on the surface to be processed. It causes a problem such that, due to the residual polyimide film, it is difficult to accurately form the slider rail by processing.

In Japanese Unexamined Patent Application Publication Nos. Hei 11-96531 and Hei 10-302237, a method of covering the surfaces except for the surface to be processed of a row bar with a polyimide film or the like in order to prevent adhesion of a foreign matter to the row bar is proposed. According to the method, since atoms sputtered from the surface of the support substrate which occur in etching process or the like are adhered to the polyimide film, by removing the polyimide film after completion of the processing, the atoms can be easily removed. The publications, however, do not disclose a method of preventing the support substrate itself from being damaged.

The applicant of the present invention has proposed a method of bonding and fixing the surface opposite to the surface to be processed of each of a plurality of row bars to a support substrate while aligning the surfaces to be processed of the row bars to a predetermined reference plane in Japanese Unexamined Patent Application Publication No. Hei 11-282959. According to the fixing method, the plurality of row bars can be held in a state where their surfaces to be processed are positioned within a predetermined reference plane, so that improved processing accuracy is achieved. Although it is desirable to set an adhesive for fixing the row bars as soon as possible in such a fixing method, a method of setting the adhesive in short time has not been fully examined yet.

SUMMARY OF THE INVENTION

The present invention has been achieved in consideration of the problems. It is an object of the invention to provide a method of manufacturing a magnetic head slider and a method of fixing row bars, which can realize improved processing accuracy at low manufacturing costs and can prevent adhesion of a foreign matter to the magnetic head slider, and to provide a method of manufacturing a magnetic head slider, a method of fixing row bars and a curing agent, which can make an adhesive for fixing row bars set in short time.

A method of fixing a plurality of row bars according to the invention comprises: a protective film forming step of forming a protective film for protecting a support member, on at least one entire surface of the support member; an adhesive applying step of applying an adhesive on the surface of the protective film; and a bonding step of bonding and fixing the row bars to the support member with making a surface opposite to the surface to be processed of each of the plurality of row bars come into contact with the adhesive.

In the method of fixing row bars according to the invention, a protective film is formed on at least one entire surface of the support member, an adhesive is applied on the surface of the protective film, and a surface opposite to the surface to be processed of each of row bars is attached to the adhesive. The surface to which the row bar is fixed of the support member is covered with the protective film and is protected from damage during processing of the row bar.

It is desirable that the protective film is formed by conducting a heat treatment on a polyimide precursor at predetermined temperature. Further, the temperature of the heat treatment conducted on the polyimide precursor lies, desirably, in a range form 100° C. to 150° C.

Preferably, the method further comprises a curing agent film forming step of forming a curing agent film containing a curing agent which promotes setting of the adhesive, on the surface of the protective film, between the protective film forming step and the adhesive applying step.

Another method of fixing row bars according to the invention comprises: a curing agent film forming step of forming a curing agent film containing a curing agent for promoting setting of the adhesive, on at least one of surfaces of the support member; an adhesive applying step of applying an adhesive on the surface of the curing agent film; and a bonding step of bonding and fixing the row bars to the support member with making a surface opposite to the surface to be processed of each of the plurality of row bars come into contact with the adhesive.

In the another method of fixing row bars according to the invention, a curing agent film is formed on at least one of surfaces of the support member, an adhesive is applied on the surface of the curing agent film, and a surface opposite to the surface to be processed of each of the row bars is attached to the adhesive. Since the adhesive and the curing agent film come into contact with each other, time required to set the adhesive is shortened by the action of the curing agent.

Preferably, in the bonding step, in a state where the surface to be processed of each of the row bars is in line with a predetermined reference plane, the surface opposite to the surface to be processed is allowed to come into contact with the adhesive. Preferably, the curing agent film contains an acid mordant dye. Further, the adhesive is, preferably, a cyanoacrylate adhesive.

A method of manufacturing a magnetic head slider according to the invention comprises: a device forming step of forming thin film magnetic head devices on a predetermined substrate; a cutting step of cutting the substrate into a plurality of row bars each including at least one magnetic head slider in which the thin film magnetic head device is formed; a protective film forming step of forming a protective film for protecting a support member, on at least one entire surface of the predetermined support member; an adhesive applying step of applying an adhesive on the surface of the protective film; a bonding step of bonding and fixing the row bars to the support member with making a surface opposite to the surface to be processed of each of the plurality of row bars come into contact with the adhesive; a processing step of performing predetermined processing on the plurality of row bars fixed to the support member in the bonding step; and a separating step of cutting each of the row bars on which the predetermined processing has been performed in the processing step into magnetic head sliders.

In the method of manufacturing a magnetic head slider according to the invention, the wafer is cut into a plurality of row bars each including at least one magnetic head slider. A protective film is formed on at least one of surfaces of the predetermined support member, an adhesive is applied on the surface of the protective film, and a surface opposite to the surface to be processed of each of the plurality of row bars is fixed to the adhesive. Each of the plurality of row bars fixed to the support member is subjected to predetermined processing and is cut into magnetic head sliders. The surface to which the row bar is fixed of the support member is covered with the protective film and is protected from damage at the time of processing of the row bars.

A method of manufacturing a magnetic head slider according to the invention comprises: a device forming step of forming thin film magnetic head devices on a predetermined substrate; a cutting step of cutting the substrate into a plurality of row bars each including at least one magnetic head slider in which the thin film magnetic head device is formed; a curing agent film forming step of forming a curing agent film containing a curing agent for promoting setting of the adhesive, on at least one of surfaces of a predetermined support member; an adhesive applying step of applying the adhesive on the surface of the curing agent film; a bonding step of bonding and fixing the row bars to the support member with making a surface opposite to the surface to be processed of each of the plurality of row bars come into contact with the adhesive; a processing step of performing predetermined processing on the plurality of row bars fixed to the support member in the bonding step; and a separating step of cutting each of the row bars subjected to the predetermined processing in the processing step into magnetic head sliders.

In the method of manufacturing a magnetic head slider according to the invention, the wafer is cut into a plurality of row bars each including at least one magnetic head slider. Further, a curing agent film is formed on at least one of surfaces of a support substrate, the adhesive is applied on the surface of the curing agent film, and the surface opposite to the surface to be processed of each of the plurality of row bars is fixed to the adhesive. Each of the plurality of row bars fixed to the support member is subjected to predetermined processing and is cut into magnetic head sliders. Since the adhesive comes into contact with the curing agent film, the time required to set the adhesive is shortened by the action of the curing agent.

A curing agent according to the invention is to promote setting of a resin containing alkyl-α-cyanoacrylate.

In the curing agent according to the invention, polymerization of alkyl-α-cyanoacrylate is initiated by an anion supplied from the acid mordant dye and sets promptly.

Other and further objects, features and advantages of the invention will appear more fully from the following description.

DETAILED DESCRIPTION OF THE PREFERRED EMBODIMENT

<Configuration of Magnetic Head Slider>

First, by referring to FIGS. 1 to 3, the structure of a magnetic head slider to which a method of processing a magnetic head slider according to an embodiment of the invention is applied will be described.

Figure 1:
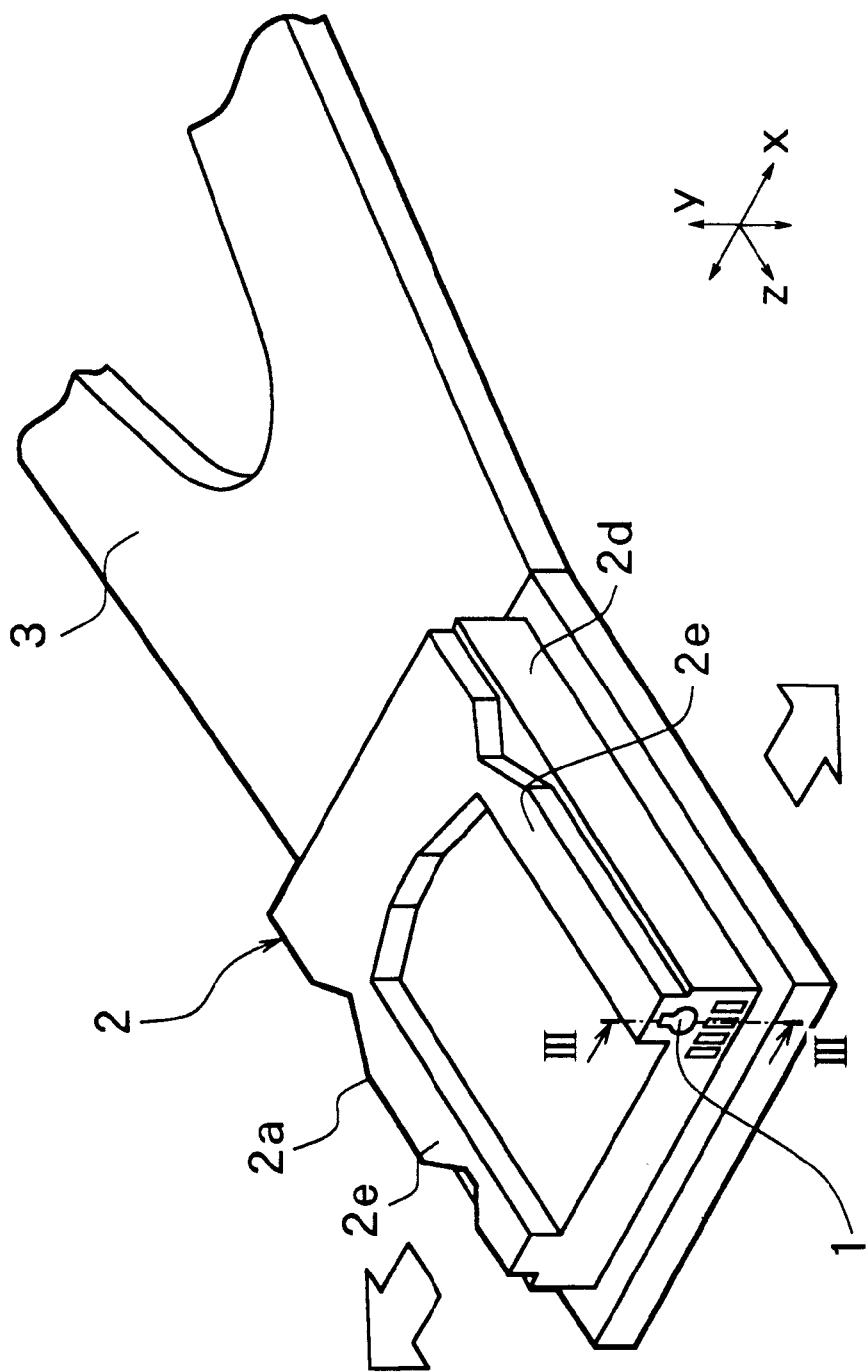
FIG. 1 is a perspective view showing the configuration of a magnetic head slider according to an embodiment of the invention, to which a method of manufacturing a magnetic head slider, a method of fixing row bars, and a curing agent are applied.

FIG. 1 shows a magnetic head slider 2 to which the method of processing head slider according to the embodiment is applied. The magnetic head slider 2 is mounted at an end of an actuator arm 3 provided in a hard disk drive (not shown). The actuator arm 3 swings by the driving force of a voice coil motor (not shown), for example. By the swing, the magnetic head slider 2 moves in a direction x of crossing track lines along a recording surface of a magnetic recording medium such as a hard disk (not shown).

The magnetic head slider 2 is a block of a substantially hexahedral shape and is disposed so that one of the surfaces of the hexahedron (the upper face in FIG. 1) closely faces the recording surface of a recording medium. A slider rail 2a having an almost U-shape is formed on the surface facing the recording surface of the recording medium. The surface of the slider rail 2a is called an air bearing surface (ABS) 2e. When the recording medium rotates, airflow generated between the recording surface of the recording medium and the air bearing surface 2e allows the magnetic head slider 2 to slightly lift from the recording surface in the direction y. Thus, a constant clearance can be created between the air bearing surface 2e and the recording medium.

A thin film magnetic head device 1 is provided on one end face (the left frontward face in FIG. 1) having a ridge line common to the air bearing surface 2e of the magnetic head slider 2.

Figure 2:
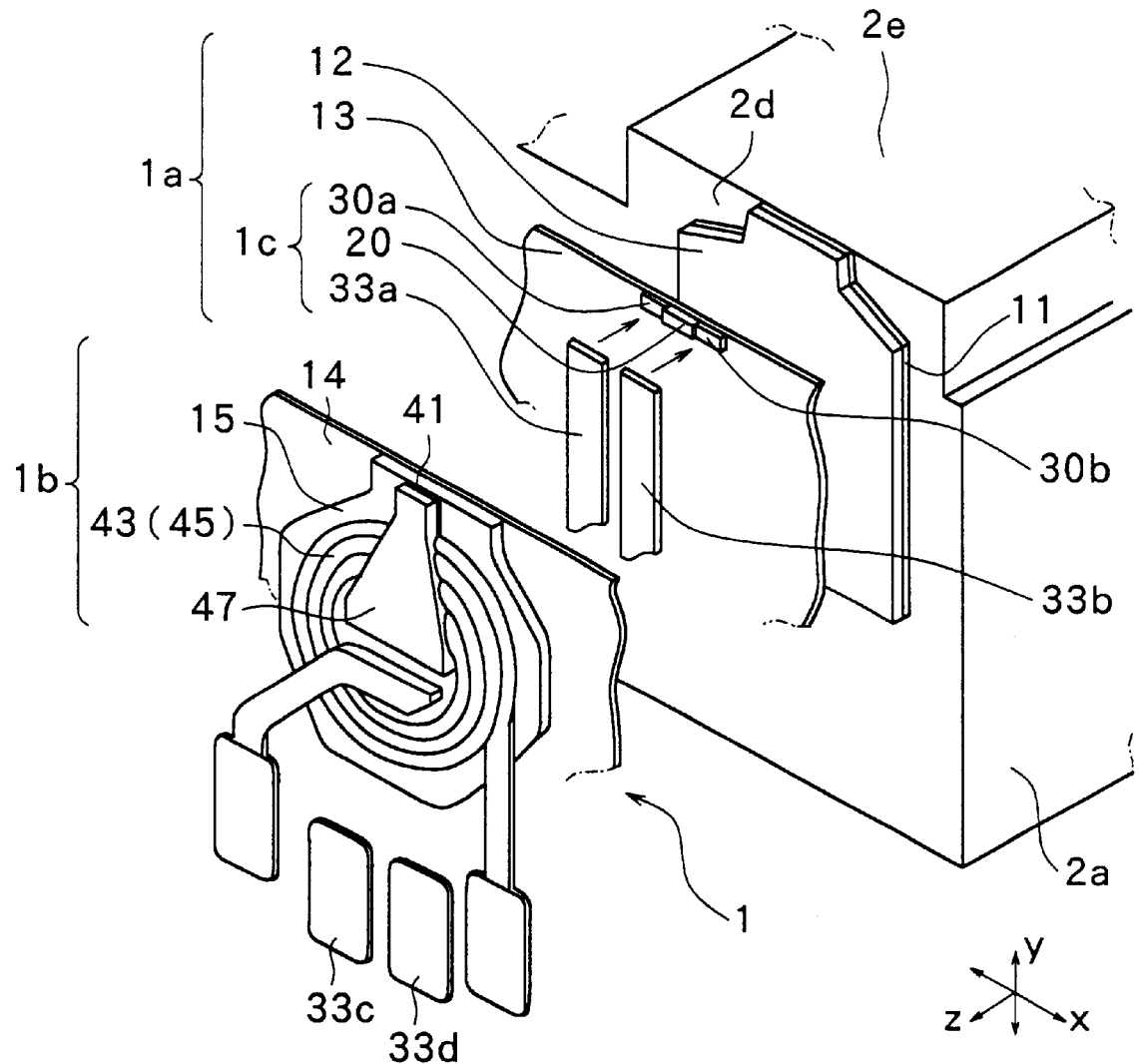
FIG. 2 is an exploded perspective view showing the configuration of a thin film magnetic head device mounted on the magnetic head slider illustrated in FIG. 1.

FIG. 2 is an exploded view of the structure of the thin film magnetic head device 1. FIG. 3 is a cross section of the thin film magnetic head device 1, taken along the line III—III of FIG. 1. The thin film magnetic head device 1 has an integral structure of a reproducing head 1a for reproducing magnetic information recorded on the recording medium and a recording head 1b for recording magnetic information onto the recording medium.

Figure 3:
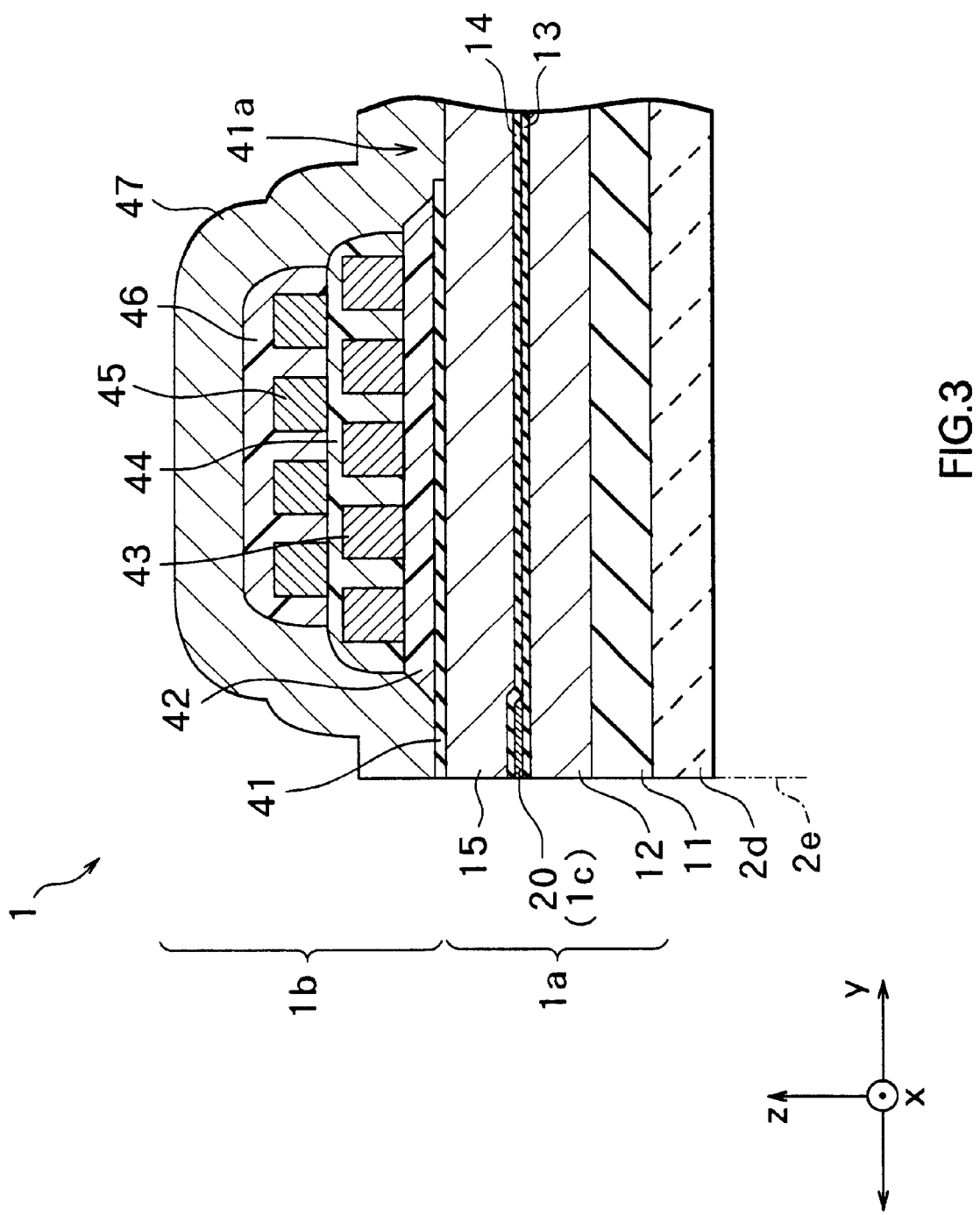
FIG. 3 is a sectional view of the structure of the thin film magnetic head shown in FIG. 1 taken along the line III—III of FIG. 1.

As shown in FIGS. 2 and 3, for example, the reproducing head 1a has a structure comprising an insulating layer 11, a bottom shield layer 12, a bottom shield gap layer 13, a top shield gap layer 14 and a top shield layer 15 which are stacked in this order on the wafer 2d of the slider 2. For instance, the insulating layer 11 is 2 μm to 10 μm in thickness and is made of $Al_2O_3$ (alumina) and the bottom shield layer 12 is 1 μm to 3 μm in thickness and is made of a magnetic material such as NiFe (nickel-iron alloy: Permalloy). Each of the bottom shield gap layer 13 and the top shield gap layer 14 is, for example, 10 nm to 100 nm in thickness and is made of $Al_2O_3$ or AlN (aluminum nitride). For example, the top shield layer 15 is 1 μm to 4 μm in thickness and is made of a magnetic material such as NiFe. The top shield layer 15 also functions as a bottom pole of the recording head 1b.

An MR (magnetoresistive) element 1c is buried between the bottom shield gap layer 13 and the top shield gap layer 14. The MR element 1c is an element for reading information written on a recording medium and is disposed on the side of the air bearing surface 2e. The MR element 1c includes an MR film 20 which is an AMR (anisotropic magnetoresistive) film or a GMR (giant magnetoresistive) film. The AMR film has a single-layer structure including a magnetic layer made of NiFe or the like. The GMR film has a multilayered structure including not only a soft magnetic layer but also a ferromagnetic layer made of CoFe (iron-cobalt alloy) or the like, and a nonmagnetic metal layer made of Cu (copper) or the like.

As shown in FIG. 2, magnetic domain control films 30a and 30b made of, for example, a hard magnetic material are formed on both sides of the MR film 20 in the direction of a track width (x direction in the drawing). The magnetic domain control films 30a and 30b are used to suppress occurrence of Barkhausen noise by applying a bias magnetic field in a fixed direction to the MR film 20. A pair of lead layers 33a and 33b disposed so as to face each other over the MR film 20 in the direction of the track width are electrically connected to the MR film 20. The lead layers 33a and 33b are made of, for example, tantalum (Ta) and formed between the bottom shield gap layer 13 and the top shield gap layer 14. The lead layers 33a and 33b extend in the direction opposite to the air bearing surface 2e and are electrically connected to output terminals 33c and 33d which are formed in a predetermined pattern on the top shield gap layer 14, through an opening (not shown) formed in the top shield gap layer 14.

As shown in FIG. 3, the recording head 1b has, for example, a write gap layer 41 of 0.1 μm to 0.5 μm thick which is an insulating film made of $Al_2O_3$ or the like on the top shield layer 15. The write gap layer 41 has an opening 41a at the position corresponding to the center of each of thin film coils 43 and 45 to be described later. The thin film coil 43 having a thickness of 1 μm to 3 μm and a photoresist layer 44 for covering the thin film coil 43 are formed on the write gap layer 41, for example, with a photoresist layer 42 having a thickness of 1.0 μm to 5.0 μm in between. The thin film coil 45 having a thickness of 1 μm to 3 μm and a photoresist layer 46 for covering the thin film coil 45 are formed on the photoresist layer 44.

A top pole 47 having a thickness of about 3 μm made of a magnetic material having high saturation magnetic flux density, such as NiFe or FeN (iron nitride), is formed on the write gap layer 41 and the photoresist layers 42, 44 and 46. The top pole 47 is in contact with and magnetically coupled to the top shield layer 15 through the opening 41a of the write gap layer 41, which is provided in correspondence with the center of each of the thin film coils 43 and 45. Although not shown in FIGS. 2 and 3, an overcoat layer having a thickness of 20 μm to 30 μm made of, for example, Al$_2$O$_3$ is formed on the top pole 47 so as to cover the overall surface. By the structure, the recording head 1b generates a magnetic flux between the top shield layer 15 serving as the bottom pole and the top pole 47 by a current passing through the thin film coils 43 and 45 and magnetizes the recording medium by the magnetic flux generated near the write gap layer 41, thereby recording information.

The thin film magnetic head device 1 having a such structure acts as follows. A current is passed through the thin film coils 43 and 45 of the recording head 1b, whereby the magnetic flux for writing is generated and information is recorded on the recording medium. A sense current is passed through the MR film 20 of the reproducing head 1a and a change in resistance caused by a signal magnetic field from the recording medium is detected, whereby information recorded on the recording medium is read out.

<Configuration of Support Substrate>

A support substrate 90 used in a method of manufacturing the magnetic head slider 2 according to the embodiment will now be described by referring to FIG. 4. The support substrate 90 is used to support row bars 5 (FIG. 5) which are long members each comprising a plurality of magnetic head sliders 2 when the slider rails 2 are formed in the magnetic head sliders 2 by processing. The support substrate 90 is a ceramic substrate having a wafer shape. A plurality of row bars 5 are fixed onto the surface of the support substrate 90. A protective film 200 for protecting the surface of the support substrate 90 is formed on the surface of the support substrate 90. A curing agent film 201 containing a curing agent which promotes setting of an adhesive 202 to be described later is formed on the surface of the protective film 200. Further, on the curing agent film 201, the adhesive 202 made of alkyl-α-cyanoacrylate for bonding the row bars 5 is applied in a predetermined pattern.

The protective film 200 is formed by applying a solution of a polyimide precursor such as polyamide acid on the entire surface of the support substrate 90 by using a spin coater and conducting a heat treatment on the solution. In this case, the polyimide precursor such as polyamide acid becomes complete polyimide at about 250° C. In the embodiment, the heat treatment is conducted at temperature lower than the temperature at which the polyimide precursor becomes complete polyimide (that is, temperature lower than 250° C.). On the other hand, in order to obtain minimum strength which is necessary as a protective film, temperature of the heat treatment for the polyimide precursor has to be 100° C. or higher. More preferably, the temperature of the heat treatment for the polyimide precursor lies in a range from 100° C. to 150° C.

The protective film 200 obtained by conducting the heat treatment on the polyimide precursor at temperature within the above temperature range is used for the following reasons.
1. Within the temperature range, setting of the polyimide precursor is progressed to a degree at which the polyimide precursor does not dissolve in alcohol or acetone. Consequently, the protective film 200 does not peel during multiple photolithographic processes.
2. Since the polyimide precursor has not become complete polyimide in the temperature range, it dissolves in NMP and is easily removed.

As a specific example of the polyimide precursor, Semicofine™ made by Toray Industries, Inc. can be used. In this case, since the temperature at which the precursor becomes complete polyimide is 300° C., a heat treatment is conducted at temperature which is lower than 300° C. and at which the minimum strength can be obtained. More preferable heat treatment temperature is, for example, about 120° C.

The curing agent film 201 is used to promote setting of the adhesive 202 by supplying anions to the adhesive 202 made of cyanoacrylate and contains a curing agent made of an acid mordant dye (also called a chrome dye). At the time of forming the curing agent film 201, a solution containing the acid mordant dye and polyester resin is coated on the protective film 200 of the support substrate 90 by using a spin coater and then a heat treatment is conducted at, for example, 50° C. to 150° C. The adhesive 202 is coated on the curing agent film 201 in a predetermined pattern by a dispenser 94 which will be described later.

The curing agent film 201 is made of an anion such as a chrome complex and a cation such as K (potassium) as shown in the following Formula 1.

[Formula 1]

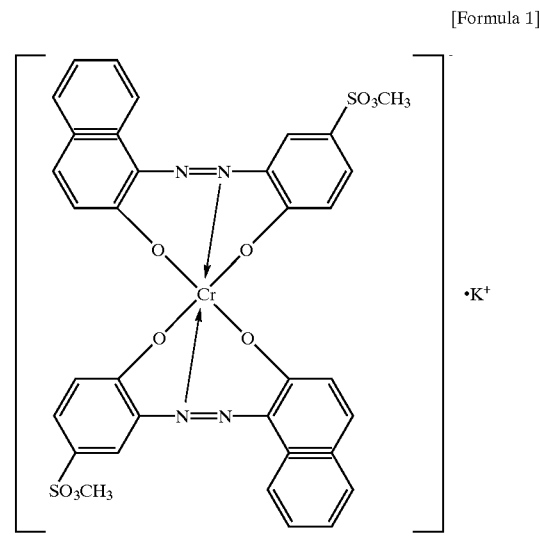

On the other hand, as shown in the following Formula 2, alkyl-α-cyanoacrylate has a cyano group having a strong electron attracting force and an alkoxy carbonyl group. Consequently, the electron density around a carbon atom coupled to both groups (what is called a carbon atom in the α position) is high and the electron density around an adjacent carbon atom (what is called a carbon atom in the β position) is low. Since there is such an electron density distribution, an extremely weak anion becomes a polymerization initiator and a polymerization reaction as shown by Formula 3 progresses.

[Formula 2]

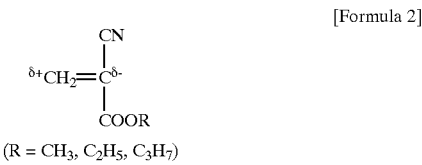

(R = CH$_3$, C$_2$H$_5$, C$_3$H$_7$)

[Formula 3]

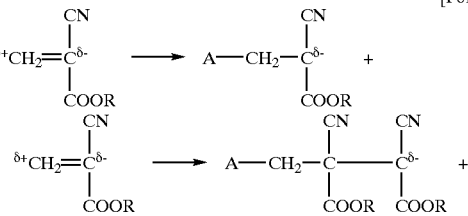

-continued

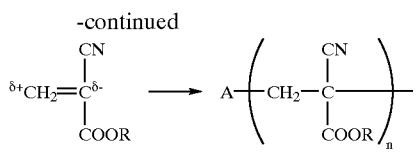

Figure 4:
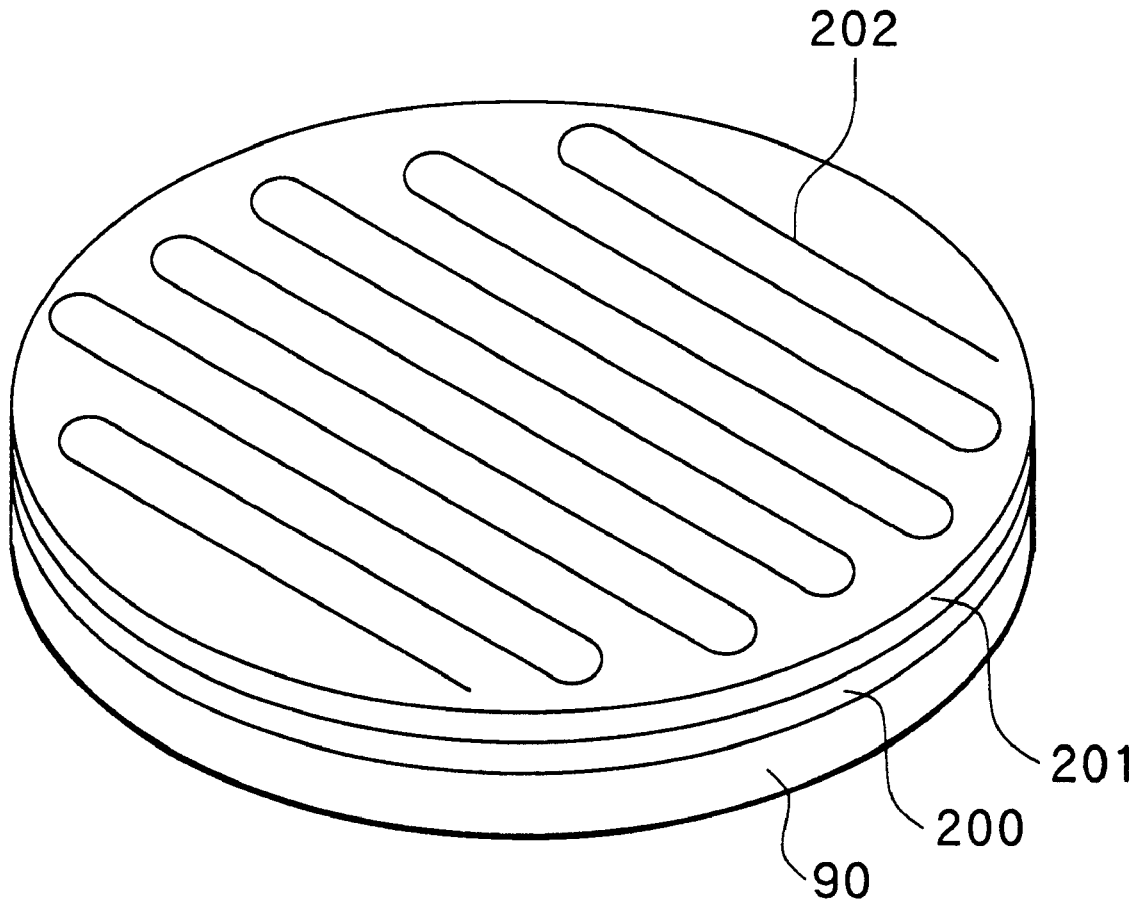
FIG. 4 is a perspective view showing the configuration of a support member used in the method of manufacturing a magnetic head slider according to the embodiment of the invention and the method of fixing row bars.

As shown in FIG. 4, therefore, when the adhesive 202 is coated on the curing agent film 201, the polymerization reaction of the adhesive 202 promptly progresses by the anion supplied from the acid mordant dye in the curing agent film 201. That is, the adhesive 202 is set in very short time after it is coated on the curing agent film 201.

In the embodiment, the protective film 200 and the curing agent film 201 are formed on the support substrate 90 in advance. During a period since the adhesive 202 is coated on the curing agent film 201 until the adhesive 202 is set, a plurality of row bars 5 are bonded and fixed on the support substrate 90 by using a row bar aligner 6 which will be described later.

The support substrate 90 corresponds to an example of "support member" in the invention. The protective film 200 corresponds to an example of "protective film" in the invention. The curing agent film 201 corresponds to an example of "curing agent film" in the invention. The adhesive 202 corresponds to an example of "adhesive" in the invention.

<Configuration of Row Bar Alignment>

Figure 5:
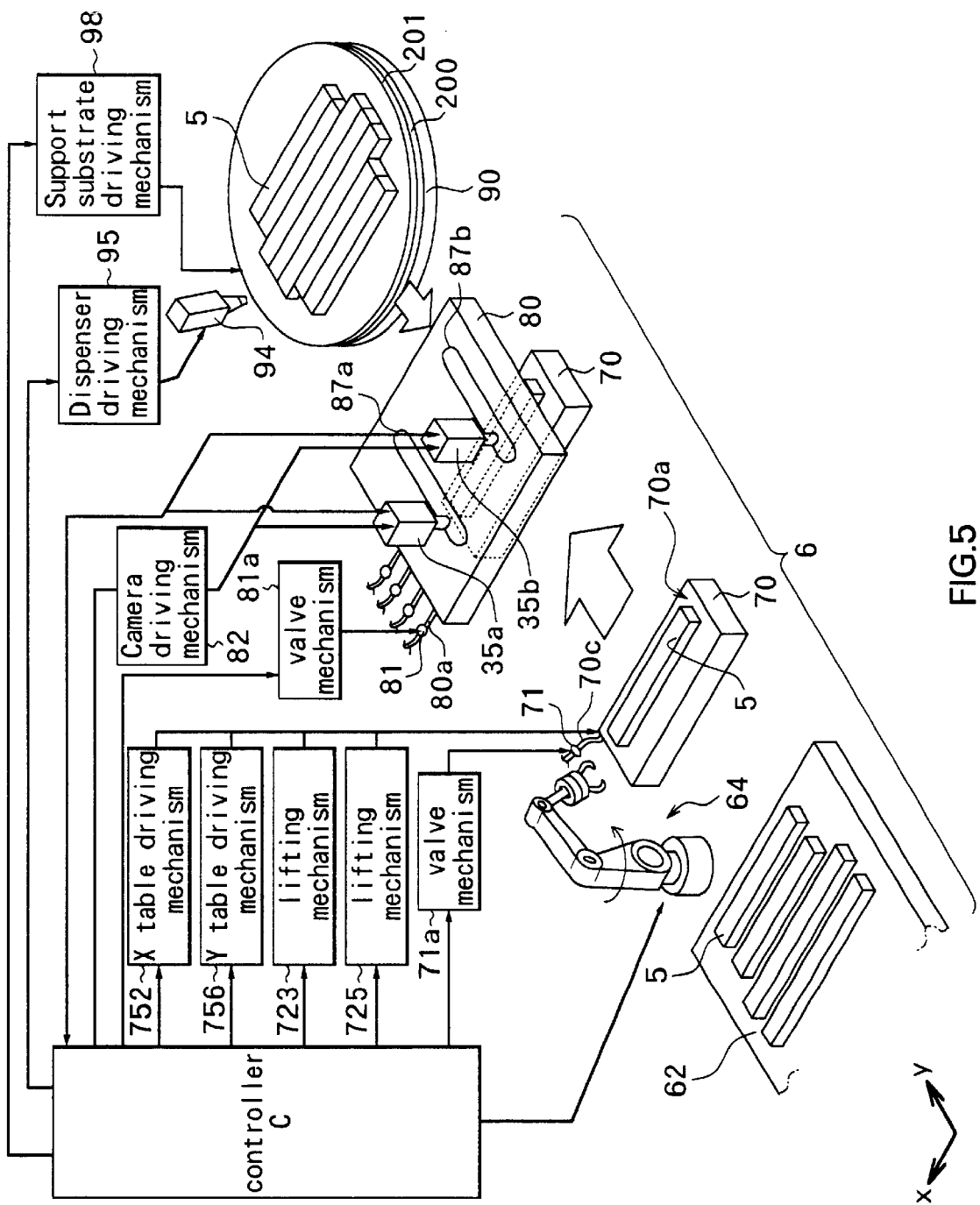
FIG. 5 is a diagram showing a schematic configuration of an aligner used in the method of manufacturing a magnetic head slider according to the embodiment of the invention and the method of fixing row bars.

FIG. 5 shows a basic configuration of a row bar aligner for use in the method of manufacturing a magnetic head slider according to the embodiment. The row bar aligner 6 is configured so as to align a plurality of row bars 5 in such a manner that their surfaces to be processed are in line with a predetermined reference plane and so as to position the row bars 5 in a plane parallel to the above-mentioned reference plane. As shown in FIG. 5, the row bar aligner 6 performs necessary works while carrying the row bars 5 in one direction in a horizontal plane (the direction from the lower left to the upper right in FIG. 5). In the following description, the direction in which the row bars 5 are carried in the row bar aligner will be referred to as a Y direction and the direction perpendicular to the Y direction in the horizontal plane will be referred to as an X direction.

The row bar aligner 6 has: a palette 62 on which a plurality of row bars 5 are horizontally placed in the Y direction; a robot 64 for picking up the row bars 5 on the palette 62 one by one; a carrier 70 for receiving and carrying the row bars 5 one by one, which have been picked up by the robot 64; a suction plane 80 for attracting and holding the plurality of row bars 5 carried by the carrier 70; and the above-described support substrate 90 for supporting the row bars 5 transferred from the suction plate 80. Mechanisms for driving the robot 64, the carrier 70 and the support substrate 90 are driven under the control of a controller C.

The palette 62 is a plate-shaped member having an area large enough to place a predetermined number of row bars 5 (e.g., fifty row bars 5) thereon. The robot 64 performs a series of operations of grasping the row bars 5 on the palette 62 one by one and placing the row bars 5 one by one onto the carrier 70. The robot 64 may have any configuration as long as it can perform such operations.

The carrier 70 takes the form of a long block including a placement surface 70a having an area large enough to place one row bar 5 thereon. A line of suction holes (not shown) is formed in the placement surface 70a in the longitudinal direction of the carrier 70. These suction holes are coupled to a pipe 70c extending outward from the carrier 70. The pipe 70c has a valve 71 which is opened or closed by a valve driving mechanism 71a. The carrier 70 is configured so as to suck and hold the row bar 5 by the placing surface 70a when the valve 71 is opened and to stop sucking the row bar 5 when the valve 71 is closed.

The carrier 70 can be moved in the vertical direction by a lifting mechanism 723 and can be rotated in a horizontal plane by a rotating mechanism 725. The carrier 70 is driven in the X direction by an X table driving mechanism 752 and is driven in the Y direction by a Y table driving mechanism 756. The carrier 70 is movable in a range from a position close to the robot 64 to a position below the suction plate 80.

The suction plate 80 is, for example, a plate-shaped member made of stainless steel, which has an area large enough to hold, e.g., fifty row bars 5. The under face of the suction plate 80 is a smooth surface. A plurality of lines of suction holes (not shown) are formed in the under face of the suction plate 80. The number of the lines of suction holes corresponds to the number of the row bars 5 to be sucked. The lines of suction holes are coupled to pipes 80a independent of one another for each line. Each pipe 80a is provided with a valve 81 which is opened or closed independently by a valve mechanism 81a. Thus, suction by the suction holes can be turned on or off in each line.

Two slits 87a and 87b penetrating the suction plate 80 in the thickness direction are formed in order to observe a suction position of the row bar 5, and the like: The slits 87a and 87b are formed at the positions corresponding to both ends of the row bar 5 to be sucked by the suction plate 80 in the longitudinal direction of the row bar 5 (the X direction). The slits 87a and 87b extend along in the alignment direction of the row bars 5 (that is, the Y direction). Two cameras 35a and 35b are disposed at a predetermined space in the X direction over the suction plate 80 so as to observe both ends in the longitudinal direction of each row bar 5 (to be sucked by the suction plate 80) through the slits 87a and 87b. The cameras 35a and 35b are moved along the slits 87a and 87b by a camera driving mechanism 82.

As described above, the support substrate 90 is a ceramic substrate having, for example, a wafer shape and the dispenser 94 is provided near the support substrate 90 in order to apply an adhesive to the surface of the support substrate 90. The dispenser 94 is configured so as to move along the surface of the support substrate 90 by a known dispenser moving apparatus 95 and to dispense a liquid adhesive 202 (FIG. 4) from its end.

The support substrate 90 can be moved in the Y direction by a support substrate driving mechanism 98. The support substrate 90 is movable between the position below the suction plate 80 and the position apart from the suction plate 80. In a state where the support substrate 90 is moved to a position below the suction plate 80, a plurality of row bars 5 held by the suction plate 80 can be transferred onto the support substrate 90. On the transfer of the row bars 5, the support substrate 90 is moved vertically by, for example, a few millimeters by the support substrate driving mechanism 98 in order to bring the adhesive on the support substrate 90 into contact with the row bars 5 held by the suction plate 80.

The suction surface (under surface) of the suction plate 80 corresponds to a specific example of "reference plane" of the invention.

<Method of Manufacturing Magnetic Head Slider>

Figure 6:
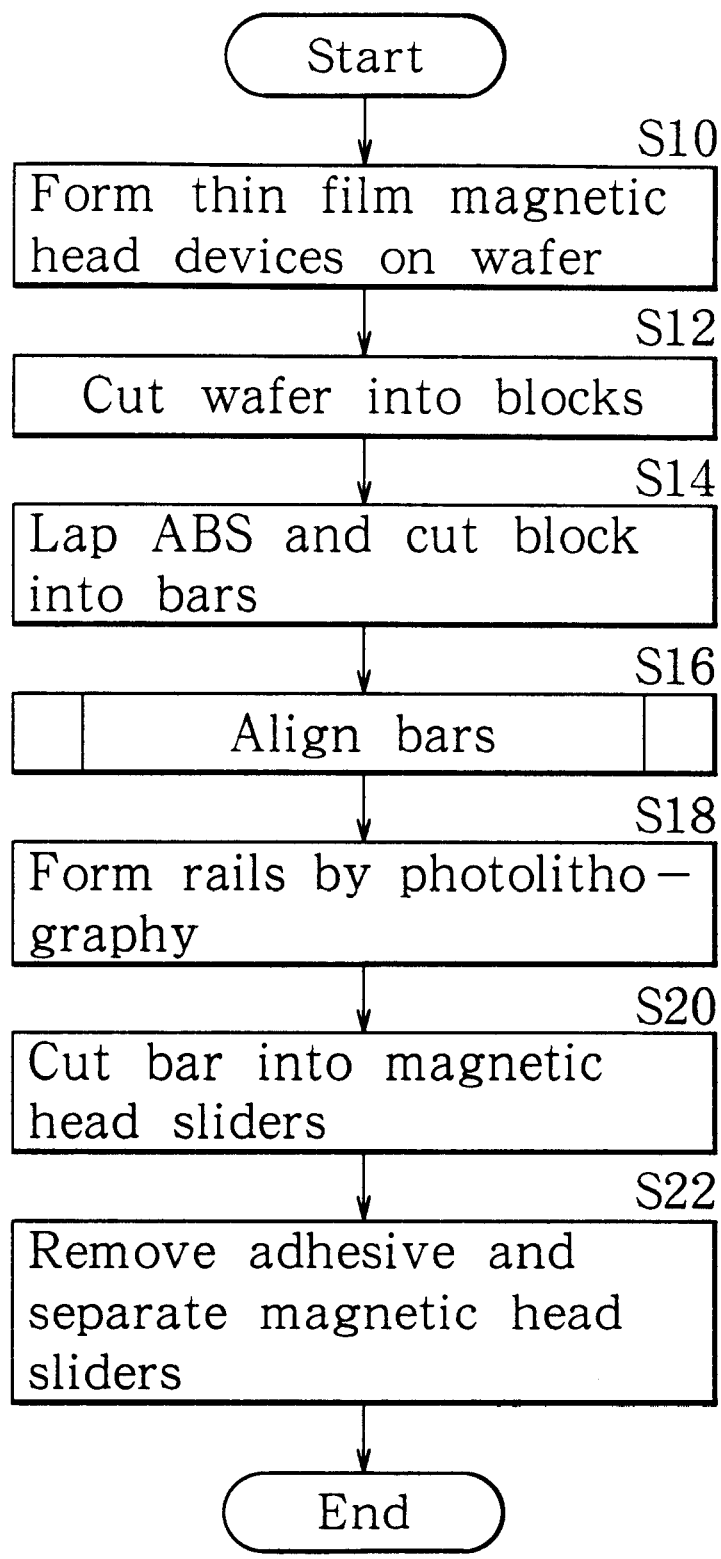
FIG. 6 is a flowchart of the method of manufacturing the magnetic head slider according to the embodiment of the invention.

FIG. 6 is a flowchart of the method of manufacturing a magnetic head slider. FIGS. 7A and 7B and FIGS. 8A to 8C are perspective views of respective steps for describing the manufacturing method shown in FIG. 6. As shown in FIG.

7A, a number of thin film magnetic head devices 1 are formed on a wafer 4 of 3 inches to 6 inches made of, for example, $Al_2O_3$-TiC by using thin film process or the like (step S10).

Thin film process in step S10 will be briefly described with reference to FIGS. 2 and 3.

First, for example, the insulating layer 11 made of an insulating material such as $Al_2O_3$ is formed on the wafer 4 by sputtering or the like. Then, the bottom shield layer 12 made of a magnetic material such as NiFe is selectively formed on the insulating layer 11 by sputtering, for example. Subsequently, an $Al_2O_3$ film is deposited on the bottom shield layer 12 by sputtering, for example. The $Al_2O_3$ film is heated, whereby the highly insulating bottom shield gap layer 13 is formed.

A stacked film for forming the MR film 20 is deposited on the bottom shield gap layer 13 by, for instance, sputtering and then a photoresist pattern is selectively formed on the stacked film. After that, the stacked film is etched by, for example, ion milling using the photoresist pattern as a mask, whereby the MR film 20 having a predetermined plan shape and size is formed. The magnetic domain control films 30a and 30b and the lead layers 33a and 33b are formed on the bottom shield gap layer 13 by sputtering, for example.

Subsequently, in a manner similar to the bottom shield gap layer 13, the top shield gap layer 14 is formed on the bottom shield gap layer 13, the MR film 20 and the lead layers 33a and 33b. After that, the top shield layer 15 is selectively formed on the top shield gap layer 14 by sputtering or the like.

After forming the top shield layer 15, the write gap layer 41 made of an insulating material such as $Al_2O_3$ is formed on the top shield layer 15 by sputtering, for instance. The photoresist layer 42 is selectively formed on the write gap layer 41 by using photolithography. Then, the thin film coil 43 is selectively formed on the photoresist layer 42 by plating or sputtering, for example. Subsequently, the photoresist layer 44 is selectively formed on the photoresist layer 42 and the thin film coil 43 in a manner similar to the photoresist layer 42. The thin film coil 45 is selectively formed on the photoresist layer 44 in a manner similar to the thin film coil 43. Furthermore, the photoresist layer 46 is selectively formed on the photoresist layer 44 and the thin film coil 45 in a manner similar to the photoresist layer 42.

After forming the photoresist layer 46, the write gap layer 41 is partly etched, whereby the opening 41a is formed near the center of the thin film coils 43 and 45. After that, the top pole 47 made of a magnetic material such as NiFe or FeN is formed on the write gap layer 41 and the photoresist layers 44 and 46 by sputtering, for example. Subsequently, the write gap layer 41 and a part of the top shield layer 15 are etched by, for example, ion milling using the top pole 47 as a mask. After that, an overcoat layer (not shown) made of, for example, $Al_2O_3$ is formed on the top pole 47 by sputtering, for example.

Figure 7A:
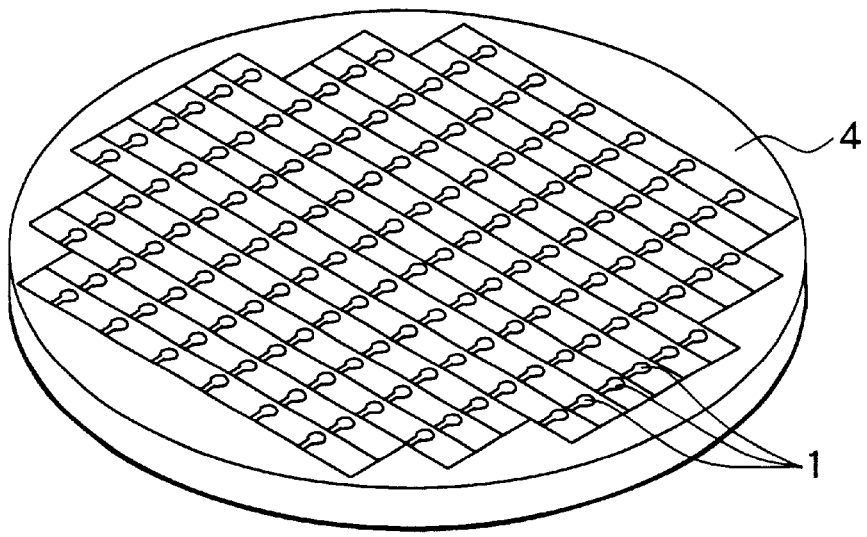
FIGS. 7A and 7B are perspective views for describing a step of forming the thin film magnetic head devices on a wafer and a step of cutting the wafer into blocks in the manufacturing method shown in FIG. 6, respectively.

In such a manner, a number of thin film magnetic head devices 1 are formed on the wafer 4 as shown in FIG. 7A.

Figure 7B:
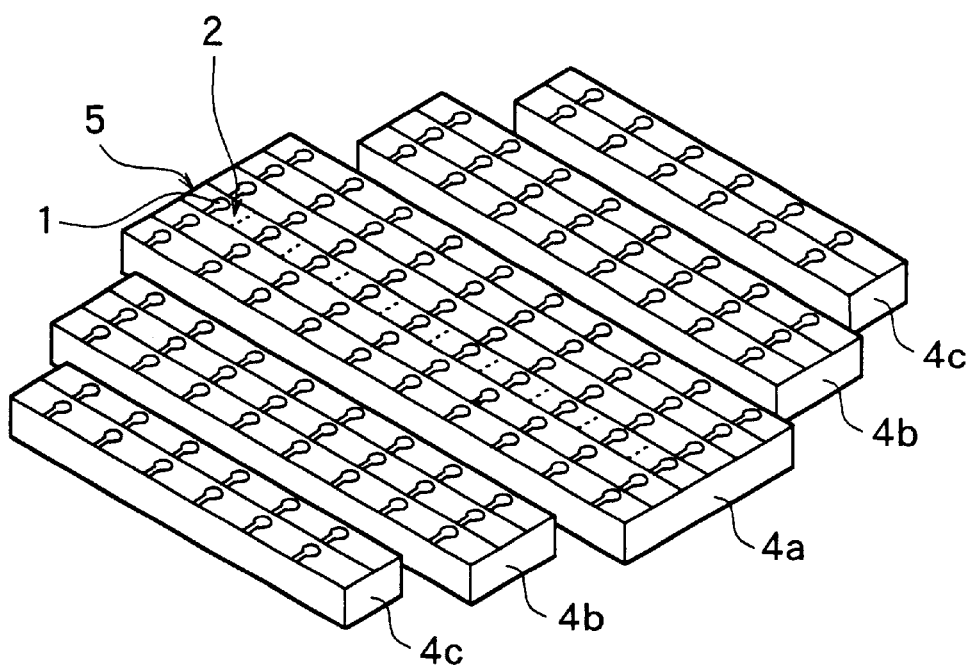

Subsequently, as shown in FIG. 7B, the wafer 4 is cut into some blocks, i.e., blocks 4a, 4b and 4c of three sizes, for example (step S12). Each of the blocks 4a, 4b and 4c corresponds to an integral structure of the stacked row bars 5 having the same length. Each row bar 5 corresponds to an integral structure of a plurality of magnetic head sliders 2, each of which has at least one thin film magnetic head device 1.

Figure 8A:
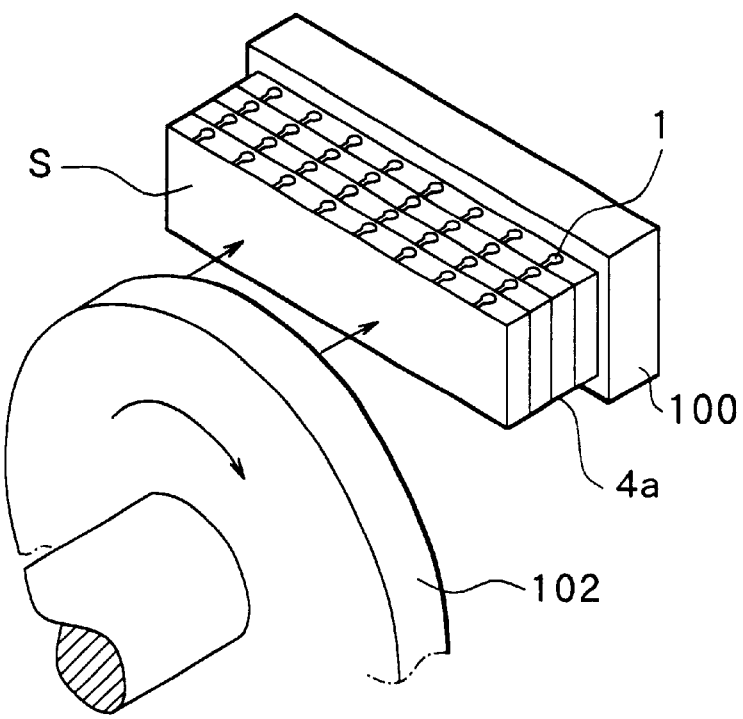
FIGS. 8A to 8C are perspective views in respective steps for describing a method of cutting and polishing row bars in the manufacturing method shown in FIG. 6.
Figure 8B:
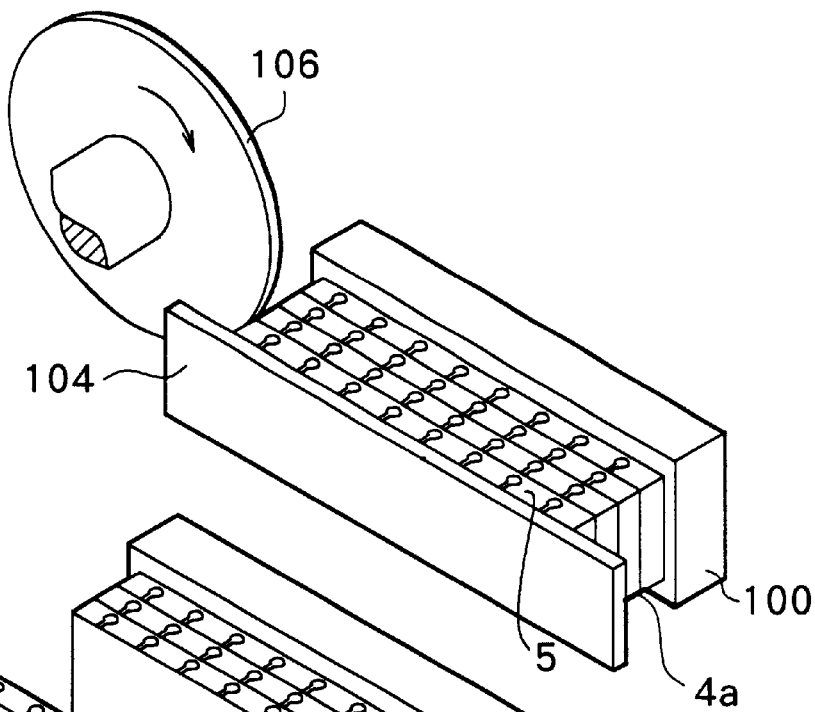

The row bars 5 are cut from the blocks 4a, 4b and 4c and are lapped (step S14). Specifically, as shown in FIG. 8A, an end face corresponding to the air bearing surface of one of the row bars 5 included in the block 4a is polished by a grinding wheel 102. At this time, the end face of the block 4a, which is opposite to the surface to be polished is fixed to a fixing jig 100. Subsequently, as shown in FIG. 8B, a protective film 104 is bonded to the polished end surface of the block 4a. The polished end surface of the block 4a is sucked and held by another jig (not shown) with the protective film 104 in between. Thus, the block 4a is sandwiched and held between the fixing jig 100 and another jig on both end surfaces of the block 4a. Then, the row bar 5 having the polished surface is cut away from the adjacent row bar 5 by a blade 106. After cutting, the protective film 104 is peeled from the row bar 5. Thus, one row bar 5 having the polished surface as shown in FIG. 8C is obtained.

Figure 8C:
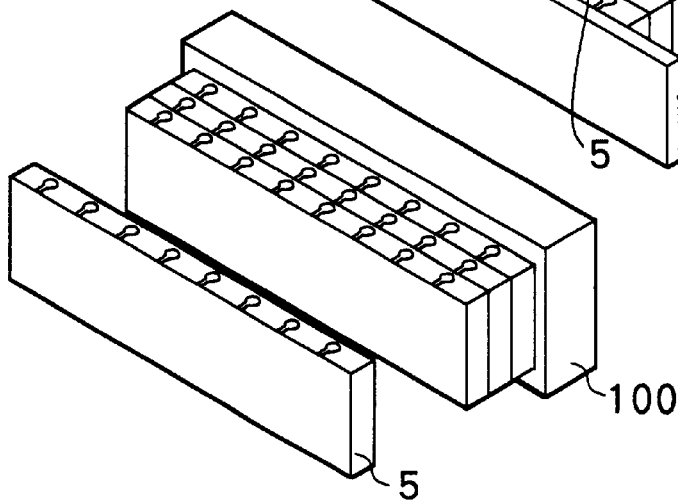

By repeating the steps shown in FIGS. 8A to 8C, the surfaces serving as the air bearing surfaces of all the row bars 5 included in the block 4a can be polished and all the row bars 5 can be cut from the block 4a. The row bars in the blocks 4b and 4c are also polished and cut from the blocks in a manner similar to those in the block 4a. In such a manner, a predetermined number of row bars 5 (e.g., fifty row bars 5) are obtained.

In the polishing process shown in FIG. 8A, which is called RLG (Resistance Lapping Guide) polishing, for controlling polishing in accordance with measured values of resistance of the thin film magnetic head device 1, changing according to the polishing amount may be employed. Since the RLG polishing is well known, its description is omitted. A combination of rough polishing and finish polishing may take place.

The plurality of row bars 5 obtained through the above-described steps are aligned by the row bar aligner 6 shown in FIG. 5 and fixed to the support substrate 90 by bonding (step S16).

Figure 9:
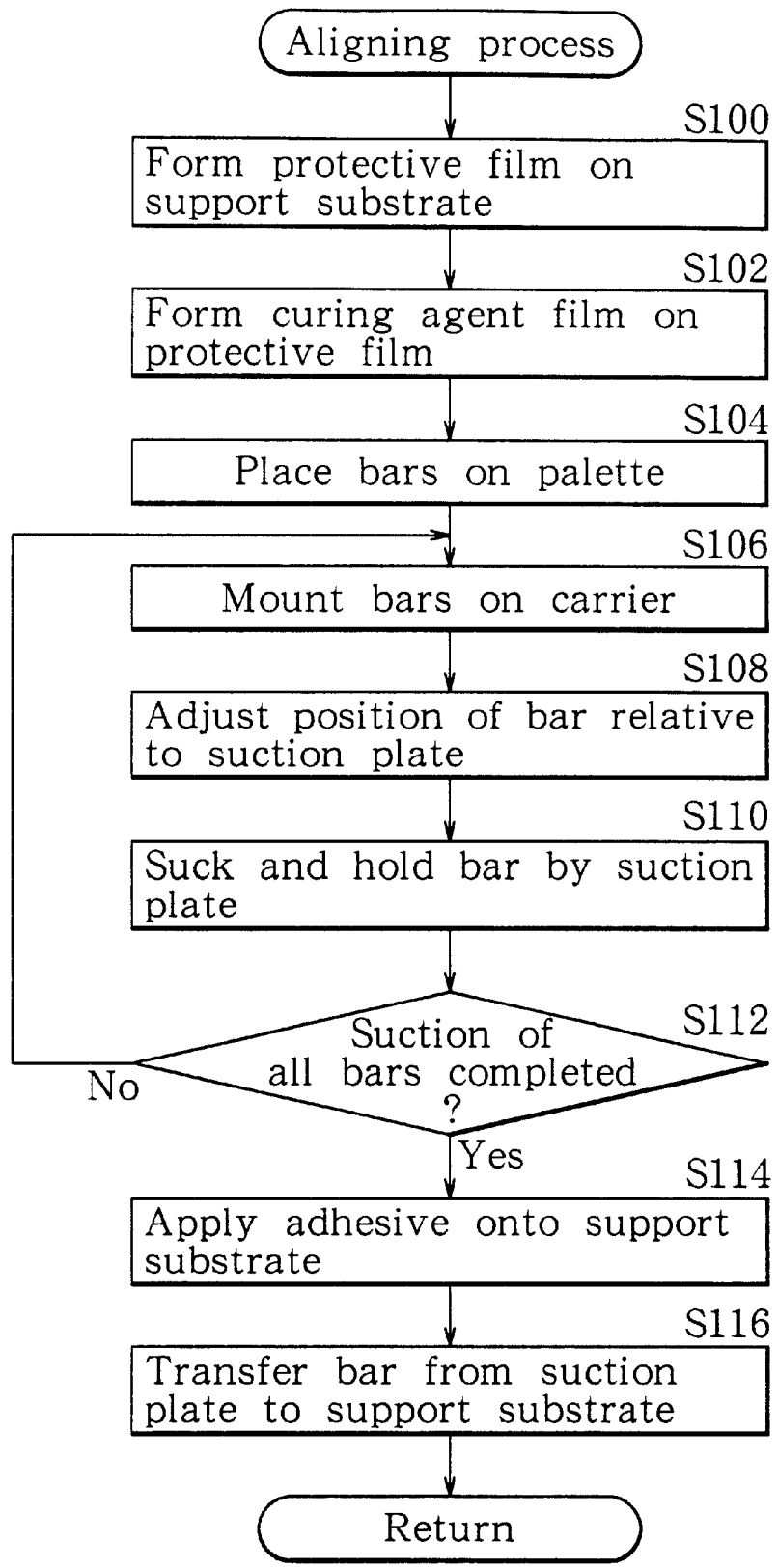
FIG. 9 is a flowchart of a process of aligning row bars in the manufacturing method shown in FIG. 6.
Figure 13A:
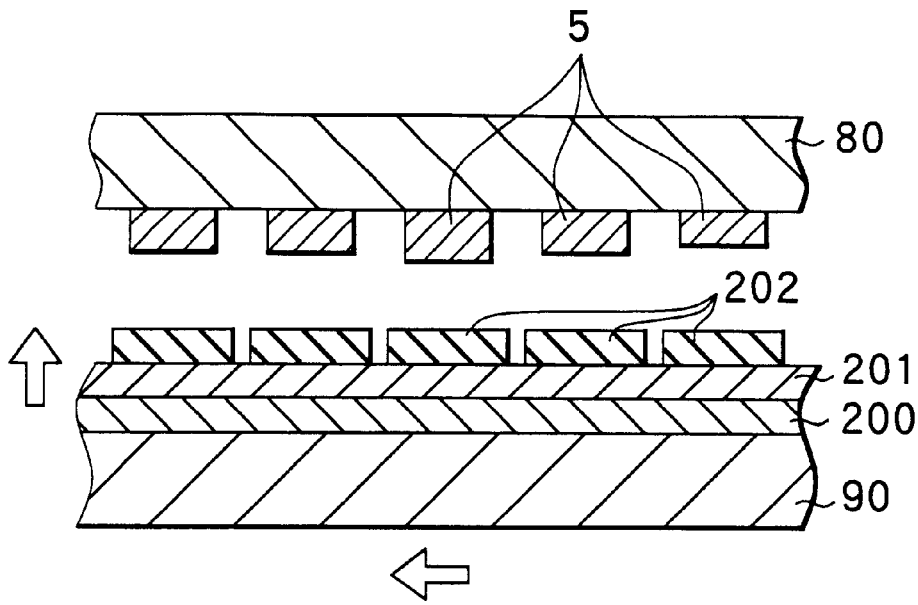
FIGS. 13A to 13C are sectional views in respective steps for describing a method of transferring row bars in the row bar aligning process shown in FIG. 9.
Figure 13B:
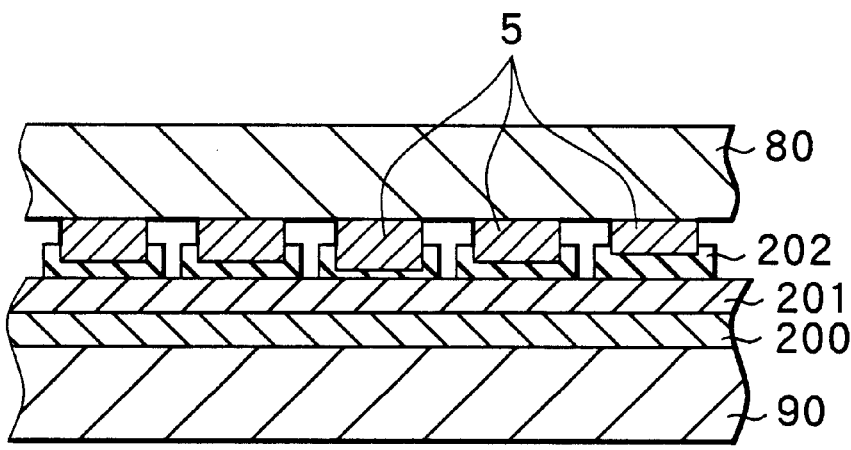
Figure 13C:
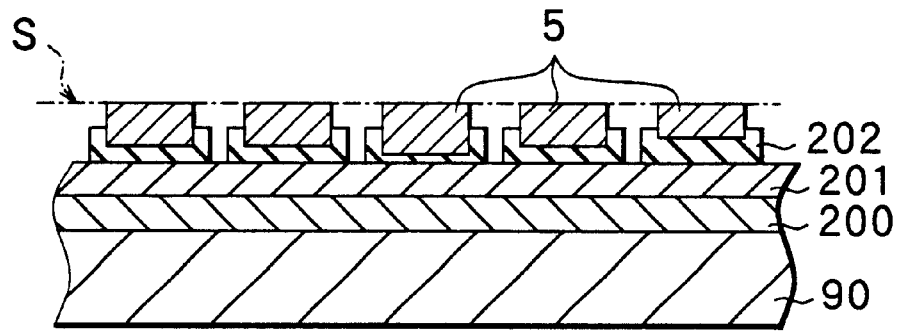

FIG. 9 is a flowchart of the aligning process performed in step S16 in FIG. 6. FIGS. 10, 11, 14 and 15 are perspective views for describing the aligning process shown in FIG. 9. FIGS. 13A to 13C are sectional views for describing the aligning process shown in FIG. 9.

In the aligning process, first, a polyimide precursor such as polyamide acid is coated on the entire surface of the support substrate 90 by using, for example, a spin coater and is heated at, for example, 120° C. for 30 minutes, thereby forming the protective film 200 shown in FIG. 4 (step S100). Then, a solution containing an acid mordant dye is coated on the protective film 200 by using, for instance, a spin coater and is heated at, for example, 120° C. for 30 minutes, thereby forming the curing agent film 201 (step S102). By the operations, the protective film 200 and the curing agent film 201 are stacked in this order on the surface of the support substrate 90.

Figure 10:
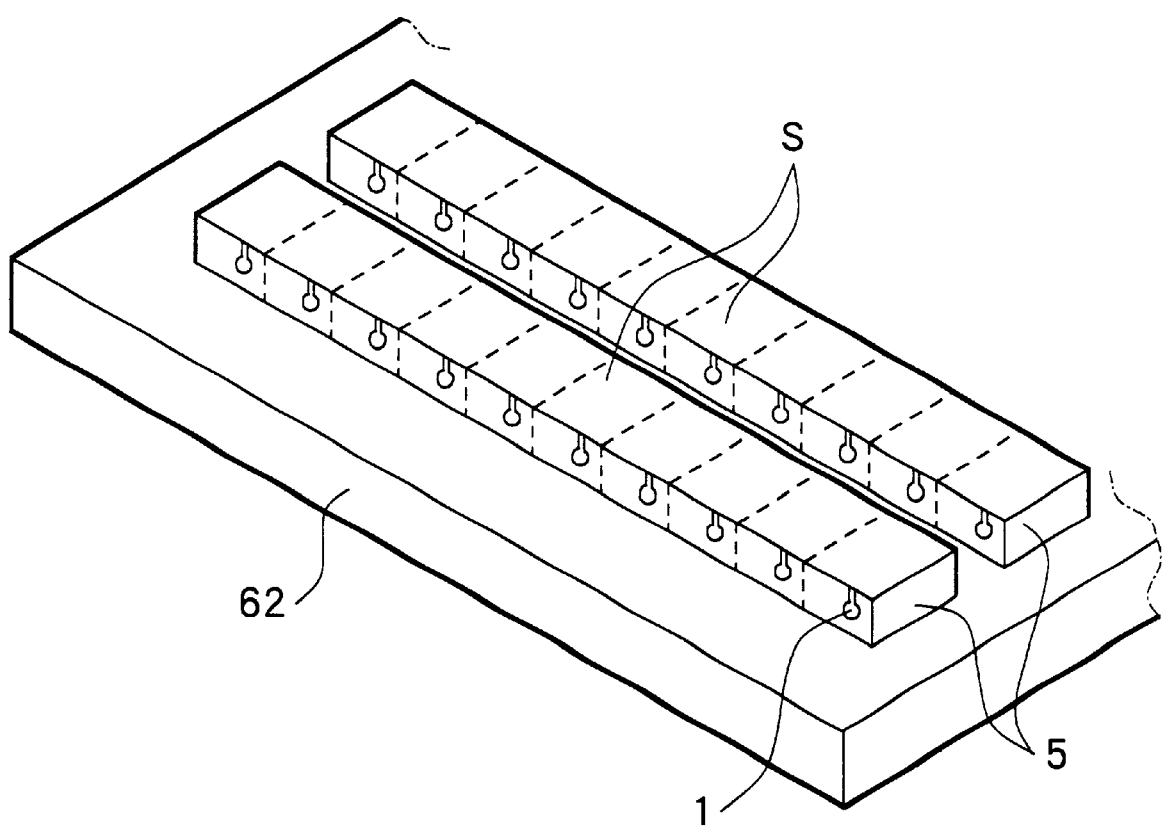
FIG. 10 is a perspective view showing a state in which the row bars are placed on a palette in the process of aligning row bars shown in FIG. 9.

Subsequently, as shown in FIG. 10, a predetermined number of row bars 5 (e.g., fifty row bars 5) are placed on the palette 62 with their surfaces each serving as the air bearing surface (indicated by the reference character S in the drawing) facing upward (step S104). At this time, the row bars 5 are aligned in a predetermined order (e.g., the same order as that before cutting the row bars 5 from the wafer 4). Position accuracy of each row bar 5 on the pallet 62 to an extent such that the pick-up of the row bar 5 by the robot 64 is not disturbed is sufficient.

Subsequently, as shown in FIG. 5, the robot 64 is driven so as to pick up and transfer the row bars 5 one by one to the carrier 70 (step S106). At this time, the controller C controls the robot 64 so that the robot 64 picks up the row bars 5 arranged on the palette 62 in a predetermined order (e.g., in the order from the row bar 5 located on the end close to the robot 64) and transfers the row bars 5 one by one to the carrier 70.

Figure 11:
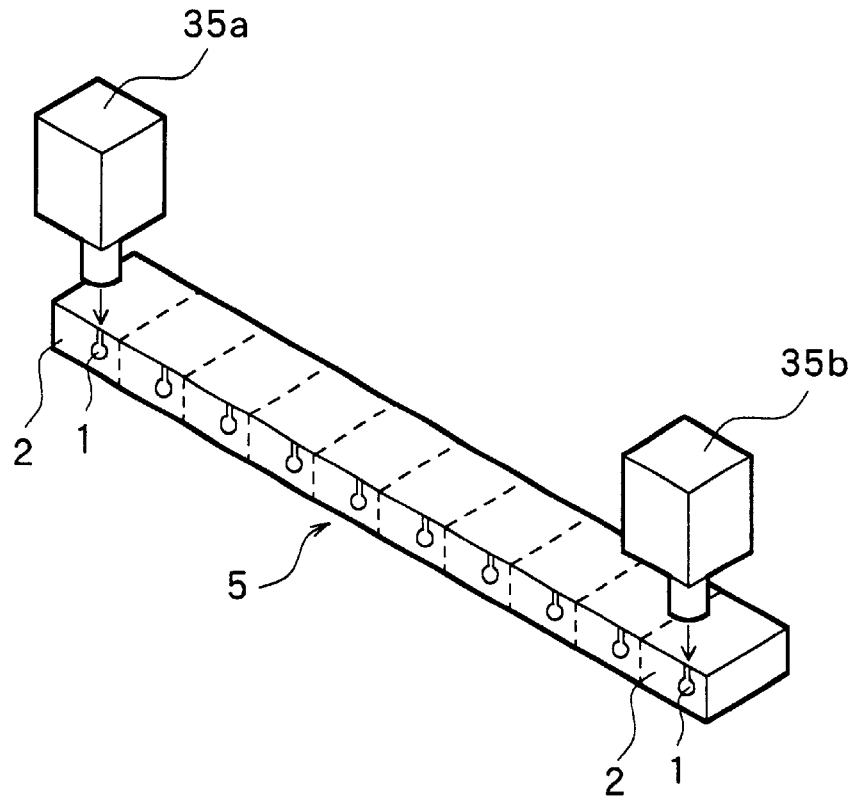
FIG. 11 is a perspective view showing a method of observing a row bar in the process of aligning row bars illustrated in FIG. 9.
Figure 12A:
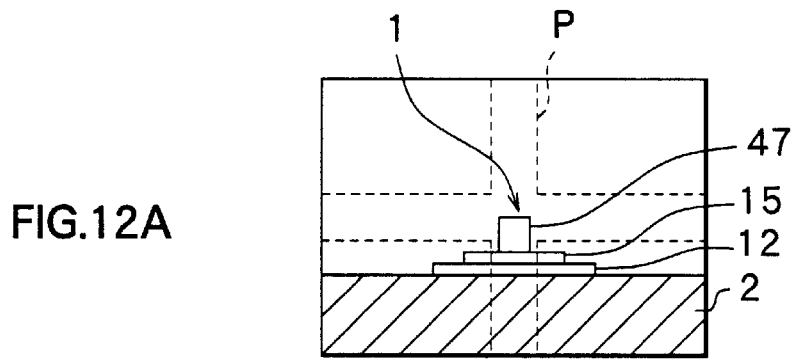
FIGS. 12A and 12B are illustrations of an example of images obtained by the method of observing the row bars shown in FIG. 10.
Figure 12B:
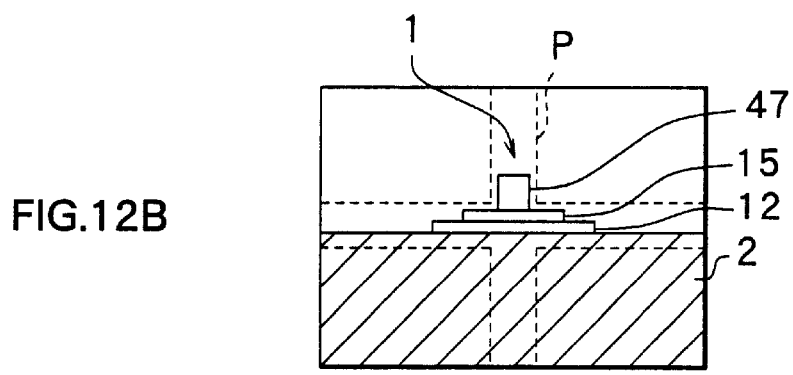

Then, the controller C drives the Y table driving mechanism 756 to move the carrier 70 to the position below the suction plate 80 and then drives the lifting mechanism 723 to lift the carrier 70 to a position just below the lower surface of the suction plate 80. In this state, the row bar 5 placed on the carrier 70 is positioned relative to the suction plate 80 in the horizontal plane (step S108). As shown in FIG. 11, the cameras 35a and 35b provided over the suction plate 80 capture image information of the thin film magnetic head devices 1 of the magnetic head sliders 2 located on both ends of the row bar 5 as shown in FIGS. 12A and 12B. The controller C (FIG. 5) obtains control information of positional deviations in the X and Y directions and inclinations of the row bar 5 on the basis of a deviation between an image of the thin film magnetic head devices 1 of the magnetic head sliders 2 located at both ends of the row bar 5 and a pattern P preliminarily stored. The controller C drives the X table driving mechanism 752, the Y table driving mechanism 756 and the rotating mechanism 725 on the basis of the control information, thereby adjusting the position of the carrier 70 in the horizontal plane.

After completion of position of the carrier 70 relative to the suction plate 80, the controller C drives the valve mechanism 81a, thereby selectively opening the valve 81 for the line of suction holes in the suction plate 80 for sucking the row bar 5. At the same time, the controller C drives the valve driving mechanism 71a, thereby closing the valve 71 to stop vacuum suction of the carrier 70. Consequently, the row bar 5 comes off from the carrier 70 and is sucked by the suction plate 80 (step S110). When the row bar 5 is sucked by the suction plate 80, the controller C moves the carrier 70 to the original position close to the robot 64. Each time the suction and holding of one row bar 5 by the suction plate 80 is finished, the controller C drives the camera driving mechanism 82 to thereby move the cameras 35a and 35b by a pitch of the row bars 5. the placement of the row bar 5 onto the carrier 70 by the robot 64 (step S106), positioning of the row bar 5 by the carrier 70 (step S108) and transfer of the row bar 5 from the carrier 70 to the suction plate 80 (step S110) are repeated only by the number of the row bars 5 (step S112). Thus, all of a predetermined number of row bars 5 can be sucked by the suction plate 80.

In such a manner, the plurality of row bars 5 are held by the suction plate 80 with their surfaces serving as the air bearing surfaces in line with the reference plane (the under face of the suction plate 80).

Then, the controller C drives the dispenser driving apparatus 95 so that the dispenser 94 applies the adhesive 202 shown in FIG. 4 onto the surface of the curing agent film 201 on the support substrate 90 (step S114). When the adhesive 202 comes into contact with the curing agent film 201, the polymerization reaction initiates.

After completion of the application of the adhesive 202 by the dispenser 94, the controller C horizontally moves the support substrate 90 to the position below the suction plate 80 as shown in FIG. 13A and lifts the support substrate 90 toward the suction plate 80 to bring the adhesive 202 into contact with the row bar 5 held by the suction plate 80. At the time point when the row bar 5 comes into contact with the adhesive 202, as shown in FIG. 13B, the adhesive 202 is not cured yet. The thickness of the adhesive 202 under each of the row bars 5 therefore corresponds to that of each of the row bars 5. After the adhesive 202 sets in the state, the suction of the suction plate 80 is stopped and the support substrate 90 is separated from the suction plate 80. By the operations, as shown in FIG. 13C, the row bar 5 is transferred from the suction plate 80 onto the support substrate 90 (step S116).

In such a manner, the plurality of row bars 5 can be aligned on the support substrate 90 with their surfaces as the air bearing surfaces in line with the reference plane (indicated by an alternate long and short dash line S in FIG. 13C). In other words, the surfaces of the plurality of row bars 5 as the air bearing surfaces are arranged at the same height (that is, distances between the surface of the support substrate 90 and the surfaces serving as the air bearing surfaces are equal to each other). The plurality of row bars 5 aligned in such a manner are taken together with the support substrate 90 from the row bar aligner shown in FIG. 5 and are loaded into an apparatus for photolithography process.

Figure 14:
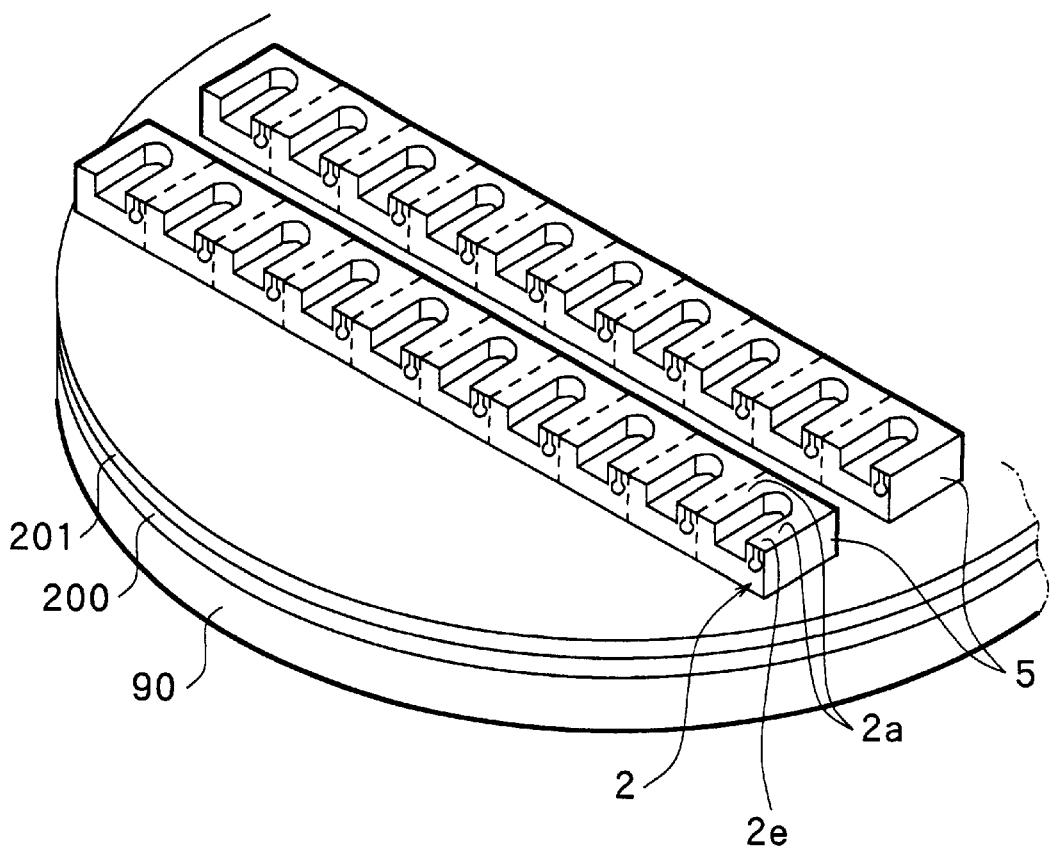
FIG. 14 is a perspective view for describing a method of forming a slider rail in the manufacturing method shown in FIG. 5.

Returning to the flowchart of FIG. 6, the step of forming the rails by photolithography in step S18 is performed. In the step of forming the rails, a dry film resist (not shown) is laminated to the row bars 5 aligned on the support substrate 90, and then the row bars 5 are exposed to light by using a full wafer aligner (not shown). After completion of exposure, development using alkali is performed, the row bars 5 are etched by ion milling or the like and the dry film resist is removed. In such a manner, as shown in FIG. 14, the slider rail 2a having an almost U shape is formed in the surface of the magnetic head sliders 2 in each of the row bars 5. The surface of the slider rail 2a serves as the air bearing surface 2e.

At this time, since the surfaces to be processed of the row bars 5 (the surfaces serving as the air bearing surfaces) are arranged at the same height, focus of exposure can be achieved properly on the surfaces to be processed of all the row bars 5. It becomes possible to eliminate variations in the photoresist pattern among the row bars. The slider rail 2a having a precise shape can be therefore formed.

Since the protective film 200 is formed by the polyimide precursor which has set to a degree at which the protective film 200 does not dissolve into alcohol or acetone, also in the case where the dry film resist is removed by using alcohol, acetone or the like in the rail forming step, the protective film 200 is not peeled off from the support substrate 90. The adhesive 202 made of alkyl-α-cyanoacrylate dissolves in NMP, acetone or the like but does not dissolve in alcohol.

Figure 15:
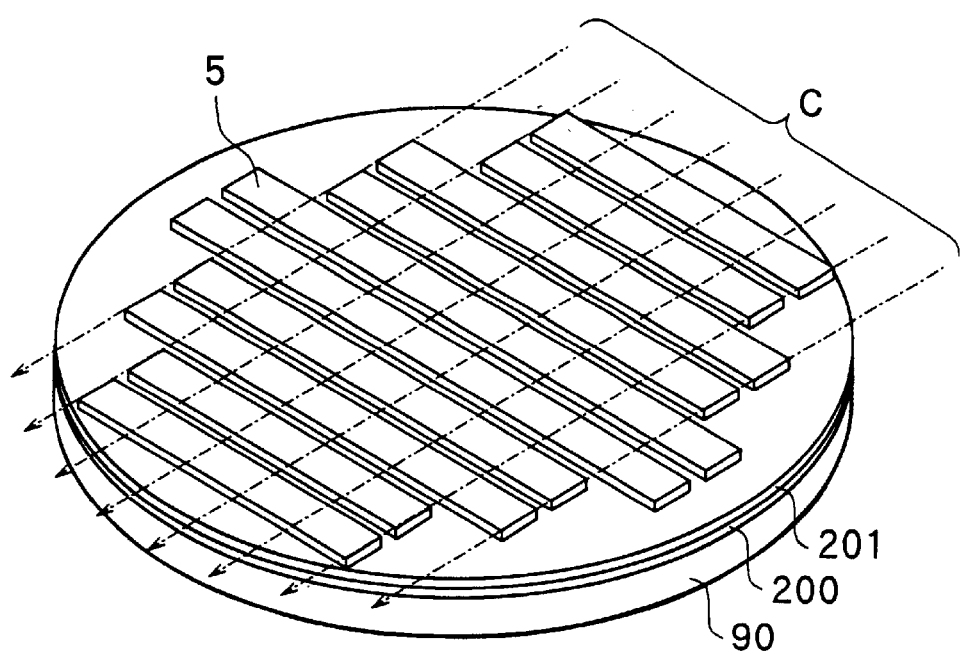
FIG. 15 is a perspective view of steps for describing a method of cutting row bars in the manufacturing method shown in FIG. 5.

After forming the slider rails 2a, each of the plurality of row bars 5 supported on the support substrate 90 is cut into the separate magnetic head sliders 2 as shown by the arrows C of FIG. 15 (step S20). Furthermore, the adhesive 202 is dissolved by using acetone, whereby the magnetic head sliders 2 are separated from the support substrate 90 (step S22). Consequently, the magnetic head slider 2 as shown in FIG. 2 is obtained. Alternatively, after separating the row bars 5 from the support substrate 90 by dissolving the adhesive, each of the row bars 5 may be cut into the magnetic head sliders 2.

Since the polyimide precursor used to form the protective film 200 has not become complete polyimide yet, the protective film 200 easily dissolves in NMP. As the protective film 200 and the curing agent film 20 are removed, the support substrate 90 can be reused.

As described above, according to the embodiment, the protective film 200 is formed on the support substrate 90, the curing agent film 201 is formed on the protective film 200, and the row bars 5 are fixed on the curing agent film 201 by using the adhesive 202. Consequently, the support substrate 90 can be protected from damage during the etching in the rail forming step. Thus, the support substrate 90 can be reused. Since the support substrate 90 is protected by the protective film 200, the atoms of the surface of the support substrate 90 do not sputter to the surface to be processed and side faces of each of the row bars 5 in the etching step. Further, since the protective film 200 is in contact with only the surface opposite to the surface to be processed of the row bar 5, a case such that the protective film 200 covers a part of the surface to be processed hardly occurs. Consequently, the surface to be processed can be precisely processed.

In addition, the polyimide precursor used for forming the protective film 200 sets to a degree at which the polyimide precursor does not dissolve in alcohol or acetone. For example, even when the resist removal using alcohol or the like is repeated to perform the photoresist process a plurality of times in the rail forming step, the protective film 200 is not therefore peeled off from the support substrate 90. Since the polyimide precursor of the protective film 200 has not become complete polyimide, the polyimide precursor easily dissolves in NMP. After completion of the rail forming step, therefore, the protective film 200 can be easily removed by using NMP. It makes the reuse of the support substrate 90 easier.

Since the plurality of row bars 5 are aligned with their surfaces to be processed (the surfaces serving as the air bearing surfaces) in line with the reference plane, even when full-wafer exposure is performed to form the slider rails 2a, exposure focus can be properly achieved on all the surfaces to be processed. Accordingly, the slider rails 2a each having a precise shape can be formed. Moreover, full-wafer exposure can be performed by inexpensive equipment as compared to so-called step-and-repeat exposure for exposing the row bars 5 one by one. Therefore, manufacturing costs can be reduced. In addition, since the position of the row bar 5 in the plane parallel to the suction surface of the suction plate 80 is adjusted, no positional deviation between the exposure pattern for the full-wafer exposure and the row bar 5 occurs. In such a manner, the slider rail 2a having a precise shape can be formed.

Since the acid mordant dye (chrome dye) is used as the curing agent contained in the curing agent film 201, it is possible to make the curing agent stably exist in the surface after the curing agent is applied and the effect is stably maintained.

In addition, the row bars 5 are once held by the suction plate 80 having the surface for determining the reference plane and are transferred onto the support substrate 90. Thus, the plurality of row bars 5 can be transferred onto the support substrate 90 at a time. The manufacturing time can be reduced accordingly.

Furthermore, the row bar 5 is positioned relative to the reference plane concurrently with observation of the thin film magnetic head devices 1 of the magnetic head sliders 2 located at both ends of the row bar 5. The position of each row bar 5 can be therefore precisely matched to the position of the exposure pattern in the rail processing step using photolithography, for example.

Although the invention has been described above by the embodiment, the invention is not limited to the embodiment, and various modifications of the invention are possible. For instance, although both the protective film 200 and the curing agent film 201 are stacked on the support substrate 90 in the foregoing embodiment, either the protective film 200 or the curing agent film 201 may be formed. That is, it is possible to form only the protective film 200 on the support substrate 90 and apply the adhesive 202 on the protective film 200. It is also possible to form only the curing agent film 201 on the support substrate 90 and apply the adhesive 202 on the curing agent film 201. The adhesive 202 may be supplied onto the curing agent film 201 by a method other than application.

Although the adhesive 202 obtained by conducting a heat treatment on the polyimide precursor at temperature such that the polyimide precursor does not become polyimide is used in the embodiment, any other material may be employed as long as the material is resistant to photolithography or the like and does not easily dissolve into a solvent such as alcohol.

The thin film magnetic head device 1 is not limited to a device using an AMR film or a GMR film. The thin film magnetic head device 1 may be a device using other MR film (e.g., a TMR (tunnel-type magnetoresistive) film). Moreover, the thin film magnetic head device may be a reproduce-only head or a record-only head.

As described above, according to the method of fixing row bars or the method of manufacturing a magnetic head slider of the invention, the protective film is formed on at least one of the surfaces of the support substrate, the adhesive is applied on the surface of the protective film, and the row bars are fixed by the adhesive. Consequently, the support substrate can be prevented from being damaged during processing of the row bars. Thus, the support substrate can be reused and the manufacturing costs are reduced. Since the support member is protected by the protective film, the atoms are not sputtered from the surface of the support member when processing the row bars, the adhesion of the atoms sputtered from the support substrate to the surface to be processed and side faces of each of the row bars is also prevented. Further, since the protective film comes into contact with the surface opposite to the surface to be processed of each row bar, a case such that a part of the surface to be processed is covered with the protective film hardly occurs. Thus, high accuracy processing can be realized.

Moreover, according to the method of fixing row bars or the method of manufacturing a magnetic head slider of the invention, the support member is formed by conducting the heat treatment on the polyimide precursor at predetermined temperature. Even when the process to which the polyimide precursor is resistant (for example, processing by photolithography) is repeated, the support member is therefore hardly damaged.

In addition, according to the method of fixing row bars or the method of manufacturing a magnetic head slider of the invention, the polyimide precursor is subjected to a heat treatment in a range from 100° C. to 150° C. Consequently, the protective film does not dissolve in, for example, alcohol or acetone. Even after performing photolithography a several times, the protective film is not peeled off. Since the polyimide precursor subjected to the heat treatment in the temperature range has not become complete polyimide, it dissolves in NMP (N-2-methyl-pyrrolidone) and the protective film is easily removed. That is, improved durability of the protective film is obtained and removal of the used protective film is facilitated.

According to the method of fixing row bars or the method of manufacturing a magnetic head slider of the invention, a plurality of row bars are fixed so that the surface to be processed of each of the row bars is brought into line with the predetermined reference plane. It becomes easier to bring the surfaces to be processed of the plurality of row bars into line with the reference plane. For example, in the case of performing photolithography at the time of processing, therefore, the exposure focus can be achieved on the whole surface to be processed of a row bar and the improved row bar processing accuracy is obtained.

Further, according to the method of fixing row bars or the method of manufacturing a magnetic head slider of the invention, since the curing agent film containing the curing agent is formed on the surface of the protective film, the adhesive sets in short time by the action of the curing agent.

According to the method of fixing row bars or the method of manufacturing a magnetic head slider of the invention, since the adhesive is applied on the surface of the curing agent film, the adhesive sets in short time by the action of the curing agent.

In addition, according to the method of fixing row bars or the method of manufacturing a magnetic head slider of the invention, the surface opposite to the surface to be processed of each of the plurality of row bars is made come into contact with the adhesive in a state where the surface to be processed is in line with the predetermined reference plane. Consequently, when the row bars are made come into contact with the adhesive, the thickness of the adhesive changes according to the variations in thickness of the row bars, and the adhesive promptly sets in such a state. The surfaces to be processed of the plurality of row bars can be therefore easily brought into line with the reference plane. In the case of performing, for example, photolithography at the time of processing, the exposure focus can be therefore achieved on the whole surface to be processed. The row bar processing accuracy is accordingly improved.

Further, according to the method of fixing row bars or the method of manufacturing a magnetic head slider of the invention, the curing agent contains an acid mordant dye, so that the anion can be easily supplied to, for example, alkyl-α-cyanoacrylate used to form the adhesive.

According to the curing agent of the invention, since the curing agent contains an acid mordant dye, it is possible to make the curing agent stably exist on the surface after the application and the effect is stably maintained.

Obviously many modifications and variations of the present invention are possible in the light of the above teachings. It is therefore to be understood that within the scope of the appended claims the invention may be practiced otherwise than as specifically described.

What is claimed is:

1. A method of fixing a plurality of row bars to a reusable predetermined support member in order to process a predetermined surface of each of the row bars, that is a long member including at least one magnetic head slider, comprising:

a protective film forming step of forming a protective film for protecting the support member in a later etching step, on at least one entire surface of the support member;

an adhesive applying step of applying an adhesive on the surface of the protective film; and a bonding step of bonding and fixing the row bars to the support member with making a surface opposite to the surface to be processed of each of the plurality of row bars come into contact with the adhesive.

2. A method of fixing row bars according to claim 1, wherein the protective film is formed by conducting a heat treatment on a polyimide precursor at predetermined temperature.

3. A method of fixing row bars according to claim 2, wherein the temperature of the heat treatment conducted on the polyimide precursor lies in a range from 100° C. to 150° C.

4. A method of fixing row bars according to claim 2, wherein the temperature of the heat treatment conducted on the polyimide precursor is lower than that at which the polyimide precursor becomes complete polyimide.

5. A method of fixing row bars according to claim 1, wherein in the bonding step, while holding the plurality of row bars so as to bring a surface to be processed of each of the row bars into line with a predetermined reference plane, a surface opposite to the surface to be processed is made to come into contact with the adhesive.

6. A method of fixing row bars according to claims 1, further comprising a curing agent film forming step of forming a curing agent film containing a curing agent which promotes setting of the adhesive, on the surface of the protective film, the step being provided between the protective film forming step and the adhesive applying step.

7. A method of fixing row bars according to claim 6, wherein the curing agent contains an acid mordant dye.

8. A method of fixing a plurality of row bars to a predetermined support member by using an adhesive in order to process a predetermined surface of each of the row bars, the row bar being a long member including at least one magnetic head slider, comprising:

a curing agent film forming step of forming a curing agent film containing a curing agent for promoting setting of the adhesive, on at least one of surfaces of the support member;

an adhesive applying step of applying an adhesive on the surface of the curing agent film; and a bonding step of bonding and fixing the row bars to the support member with making a surface opposite to the surface to be processed of each of the plurality of row bars come into contact with the adhesive.

9. A method of fixing row bars according to claim 8, wherein in the bonding step, while holding the plurality of row bars so as to bring the surface to be processed of each of the row bars into line with a predetermined reference plane, the surface opposite to the surface to be processed is made to come into contact with the adhesive.

10. A method of fixing row bars according to claim 8, wherein the curing agent film contains an acid mordant dye.

11. A method of fixing row bars according to claim 10, wherein the curing agent film forming step includes:

a step of forming a thin film on at least one of surfaces of the support member by using a solution containing the acid mordant dye; and a step of conducting a heat treatment on the thin film.

12. A method of fixing row bars according to claim 8, wherein the adhesive contains alkyl-α-cyanoacrylate.

13. A method of manufacturing a magnetic head slider, comprising:

a device forming step of forming thin film magnetic head devices on a predetermined substrate;

a cutting step of cutting the substrate into a plurality of row bars each including at least one magnetic head slider in which the thin film magnetic head device is formed;

a protective film forming step of forming a protective film for protecting a support member, on at least one entire surface of the predetermined support member;

an adhesive applying step of applying an adhesive on the surface of the protective film;

a bonding step of bonding and fixing the row bars to the support member with making a surface opposite to the surface to be processed of each of the plurality of row bars come into contact with the adhesive;

a processing step of performing predetermined processing on the plurality of row bars fixed to the support member in the bonding step; and a separating step of cutting each of the row bars on which the predetermined processing has been performed in the processing step into magnetic head sliders.

14. A method of manufacturing a magnetic head slider according to claim 13, wherein the protective film is formed by conducting a heat treatment on a polyimide precursor at predetermined temperature.

15. A method of manufacturing a magnetic head slider according to claim 14, wherein the temperature of the heat treatment conducted on the polyimide precursor lies in a range from 100° C. to 150° C.

16. A method of manufacturing a magnetic head slider according to claim 14, wherein the temperature of the heat treatment conducted on the polyimide precursor is lower than temperature at which the polyimide precursor becomes polyimide.

17. A method of manufacturing a magnetic head slider according to claim 13, wherein in the bonding step, while holding the plurality of row bars so as to bring a surface to be processed of each of the row bars into line with a predetermined reference plane, a surface opposite to the surface to be processed is made to come into contact with the adhesive.

18. A method of manufacturing a magnetic head slider according to claim 13, further comprising a step of forming a curing agent film containing a curing agent which promotes setting of the adhesive, on the surface of the protective film, the step being provided between the protective film forming step and the adhesive applying step.

19. A method of manufacturing a magnetic head slider according to claim 18, wherein the curing agent contains an acid mordant dye.

20. A method of manufacturing a magnetic head slider, comprising:

a device forming step of forming thin film magnetic head devices on a predetermined substrate;

a cutting step of cutting the substrate into a plurality of row bars each of which includes at least one magnetic head slider in which the thin film magnetic head device is formed;

a curing agent film forming step of forming a curing agent film containing a curing agent for promoting setting of the adhesive, on at least one of surfaces of a predetermined support member;

an adhesive applying step of applying the adhesive on the surface of the curing agent film;

a bonding step of bonding and fixing the row bars to the support member with making a surface opposite to the surface to be processed of each of the plurality of row bars come into contact with the adhesive;

a processing step of performing predetermined processing on the plurality of row bars fixed to the support member in the bonding step; and a separating step of cutting each of the row bars subjected to the predetermined processing in the processing step into magnetic head sliders.

21. A method of manufacturing a magnetic head slider according to claim 20, wherein in the bonding step, while holding the plurality of row bars so as to bring the surface to be processed of each of the row bars into line with a predetermined reference plane, the surface opposite to the surface to be processed is made to come into contact with the adhesive.

22. A method of manufacturing a magnetic head slider according to claim 20, wherein the curing agent film contains an acid mordant dye.

23. A method of manufacturing a magnetic head slider according to claim 22, wherein the curing agent film forming step includes:

a step of forming a thin film on at least one of surfaces of the support member by using a solution containing the acid mordant dye; and a step of conducting a heat treatment on the thin film.

24. A method of manufacturing a magnetic head slider according to claim 20, wherein the adhesive contains alkyl-α-cyanoacrylate.

* * * * *